United States Patent
Mashima et al.

(10) Patent No.: US 9,542,962 B2
(45) Date of Patent: Jan. 10, 2017

(54) MULTI-SENSOR READER STRUCTURE HAVING A CURRENT PATH WITH INCREASED SIZE TO REDUCE NOISE

(71) Applicant: HGST Netherlands B.V., Amsterdam (NL)

(72) Inventors: Hideki Mashima, Odawara (JP); Kenichi Meguro, Kanagawa (JP); Nobuo Yoshida, Hiratsuka (JP); Toyoshige Noridomi, Odawara (JP); Tomohiro Saito, Tachikawa (JP); Kaori Suzuki, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/604,617

(22) Filed: Jan. 23, 2015

(65) Prior Publication Data

US 2016/0217813 A1 Jul. 28, 2016

(51) Int. Cl.
*G11B 5/39* (2006.01)

(52) U.S. Cl.
CPC ............ *G11B 5/3912* (2013.01); *G11B 5/397* (2013.01); *G11B 5/3932* (2013.01); *G11B 5/3948* (2013.01); *G11B 5/3958* (2013.01)

(58) Field of Classification Search
CPC .......... G11B 5/33; G11B 5/39; G11B 5/3903; G11B 5/3906; G11B 5/3909; G11B 5/3912; G11B 5/3929; G11B 5/3932; G11B 5/3945; G11B 5/3948; G11B 5/3951; G11B 5/3954; G11B 5/3958

USPC ............... 360/314, 315, 316, 319, 320, 322, 324.2, 360/121
See application file for complete search history.

(56) References Cited

U.S. PATENT DOCUMENTS

| | | | |
|---|---|---|---|
| 5,309,305 A | 5/1994 | Nepela et al. | |
| 5,508,868 A | 4/1996 | Cheng et al. | |
| 6,717,780 B2 * | 4/2004 | Hiramoto | B82Y 10/00 257/E21.665 |
| 6,927,948 B2 | 8/2005 | Gill | |
| 7,405,907 B2 * | 7/2008 | Raastad | G11B 5/3903 324/212 |
| 7,508,613 B2 | 3/2009 | Lee et al. | |

(Continued)

OTHER PUBLICATIONS

Tsang, C. et al., "Gigabit Density Recording Using Dual-Element MR/Inductive Heads on Thin-Film Disks," IEEE Transactions on Magnetics, vol. 26, No. 5, Sep. 1990, pp. 1689-1693.

(Continued)

*Primary Examiner* — Jefferson Evans
(74) *Attorney, Agent, or Firm* — Zilka-Kotab, PC

(57) ABSTRACT

In one embodiment, a magnetic head includes a lower magnetic shield layer positioned at a media-facing surface, a pinned layer positioned above the lower magnetic shield layer at the media-facing surface, at least two MR elements extending in an element height direction by a first length positioned above the pinned layer and separated in a cross-track direction by an inner layer, bias layers extending in the element height direction by a second length positioned on outside edges of the MR elements and the pinned layer, and current paths positioned above and in electrical communication with the bias layers on either side of the inner layer, each current path extending in the element height direction away from the media-facing surface by a third length.

23 Claims, 20 Drawing Sheets

(56) References Cited

U.S. PATENT DOCUMENTS

| | | | |
|---|---|---|---|
| 7,751,148 B1* | 7/2010 | Alstrin | G11B 5/00826 |
| | | | 360/121 |
| 8,508,880 B2 | 8/2013 | Gao et al. | |
| 8,711,517 B2 | 4/2014 | Erden et al. | |
| 8,786,987 B2* | 7/2014 | Edelman | G11B 5/29 |
| | | | 360/314 |
| 8,908,933 B2* | 12/2014 | Shah | G06K 9/00288 |
| | | | 382/118 |
| 8,953,284 B1 | 2/2015 | Mashima et al. | |
| 9,082,435 B1* | 7/2015 | Braganca | G11B 5/3948 |
| 9,269,383 B1* | 2/2016 | Hattori | G11B 5/3932 |
| 9,396,744 B1* | 7/2016 | Yamashita | G11B 5/3912 |
| 9,401,162 B1* | 7/2016 | Gao | G11B 5/3906 |
| 2011/0069413 A1* | 3/2011 | Maat | B82Y 10/00 |
| | | | 360/234.3 |
| 2014/0055884 A1* | 2/2014 | Edelman | G11B 5/4886 |
| | | | 360/125.04 |
| 2015/0098152 A1* | 4/2015 | Gadbois | G11B 5/4853 |
| | | | 360/234.5 |
| 2015/0170678 A1* | 6/2015 | Mastain | G11B 5/3958 |
| | | | 360/128 |
| 2015/0243301 A1* | 8/2015 | Kief | G11B 5/11 |
| | | | 360/245.8 |
| 2015/0302873 A1* | 10/2015 | Braganca | G11B 5/3954 |
| | | | 360/119.03 |

OTHER PUBLICATIONS

Mashima et al., U.S. Appl. No. 14/596,121, filed Jan. 13, 2015.

* cited by examiner

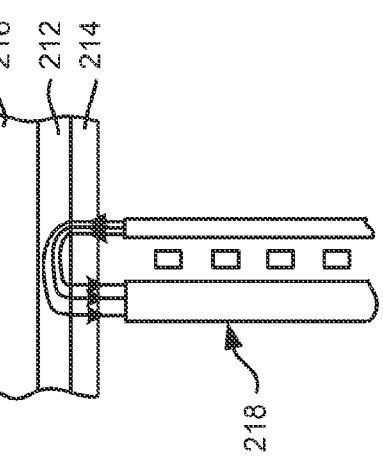
FIG. 2A
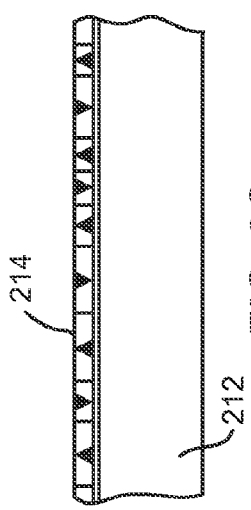
FIG. 2C
FIG. 2B
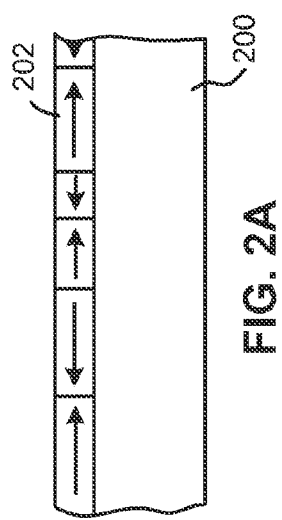
FIG. 2D
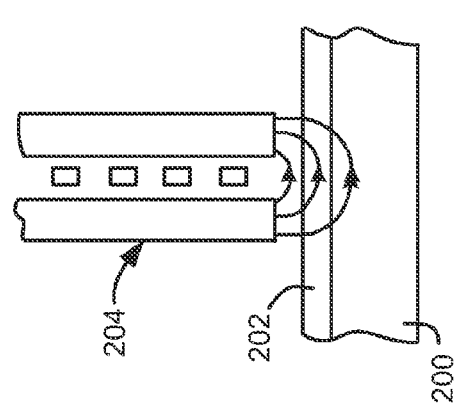
FIG. 2E

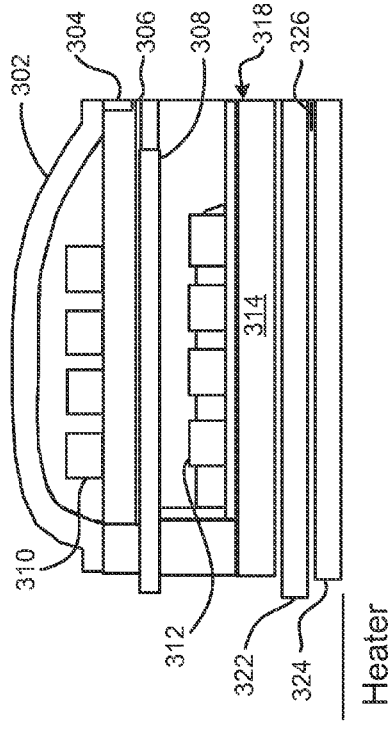
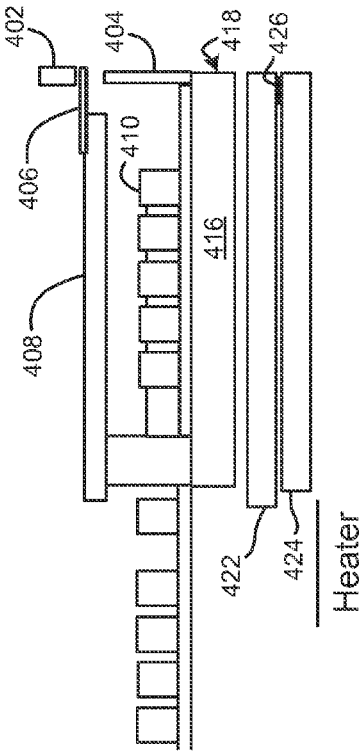
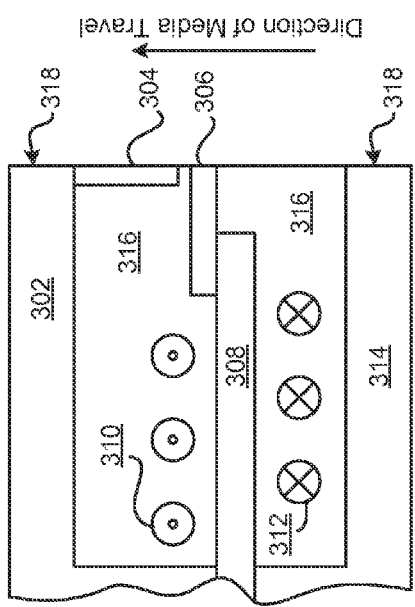
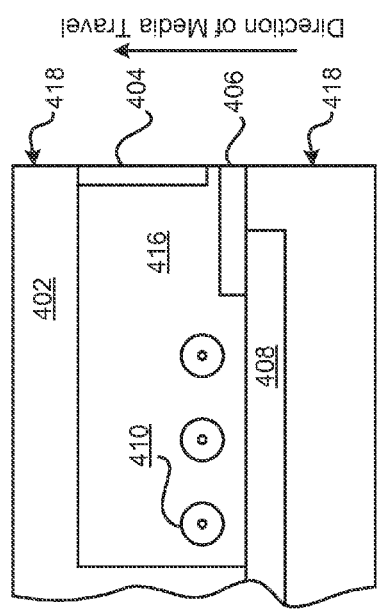
FIG. 3A
FIG. 3B
FIG. 4A
FIG. 4B

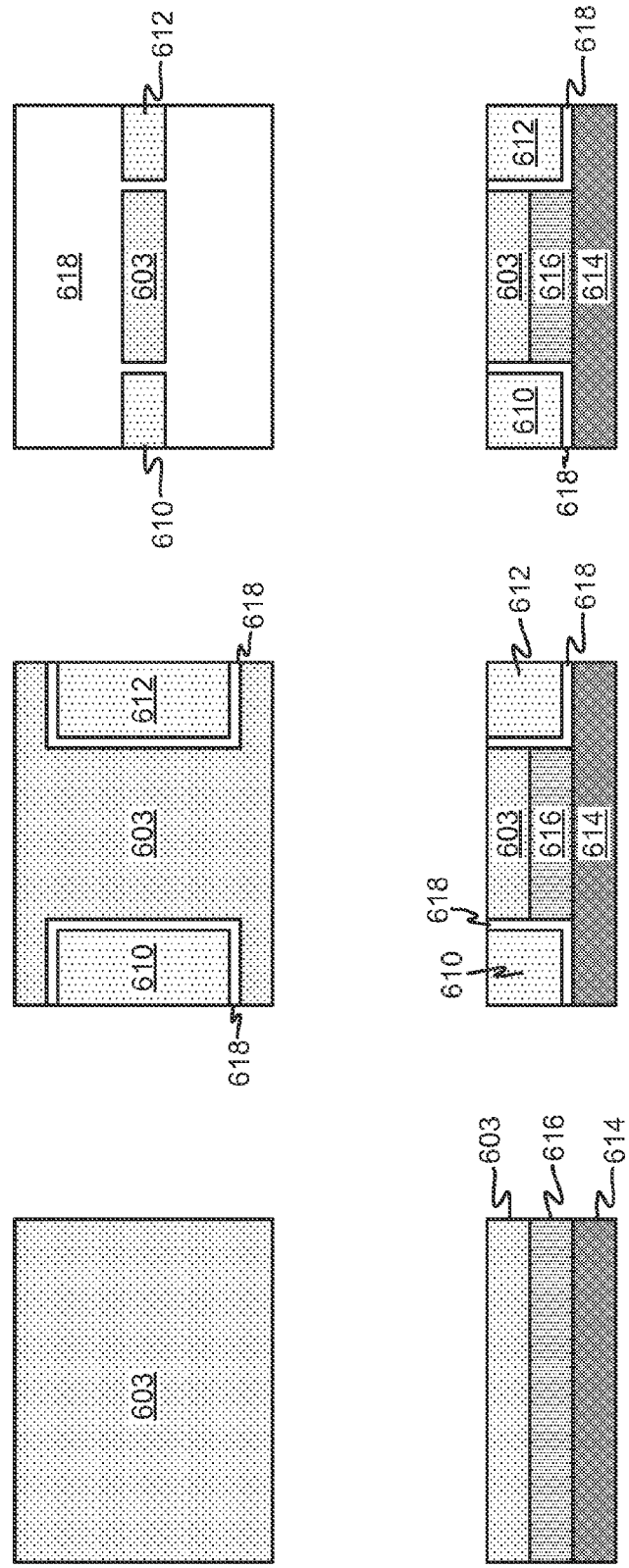

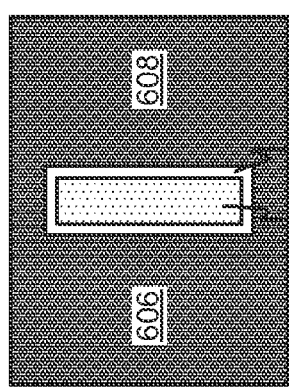
FIG. 8D
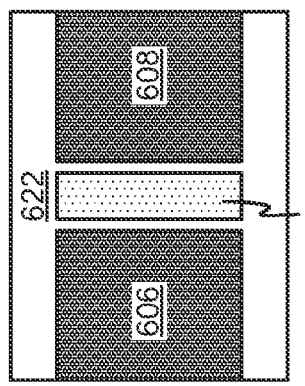
FIG. 8E
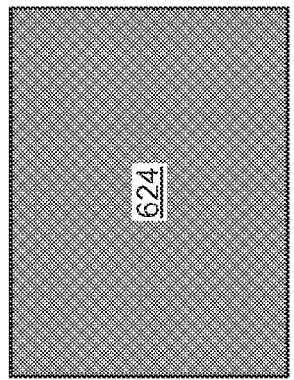
FIG. 8F
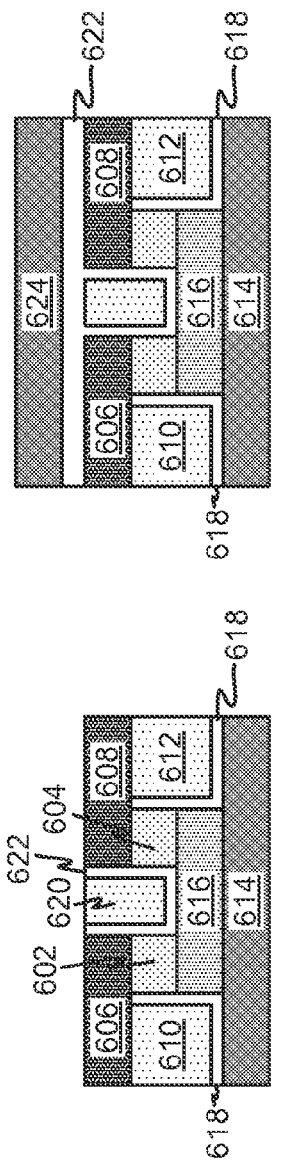
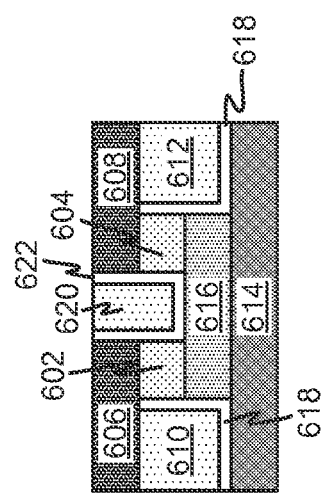

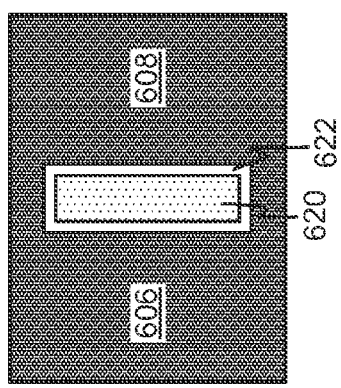
FIG. 9D
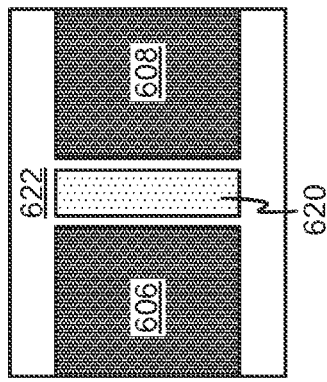
FIG. 9E
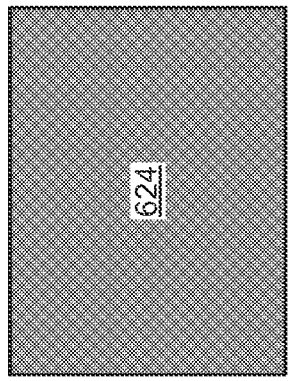
FIG. 9F
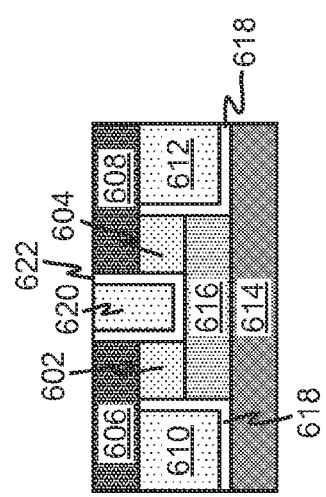
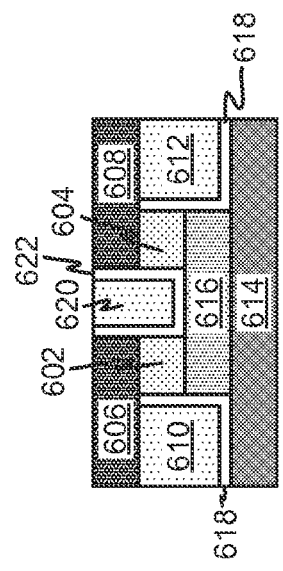
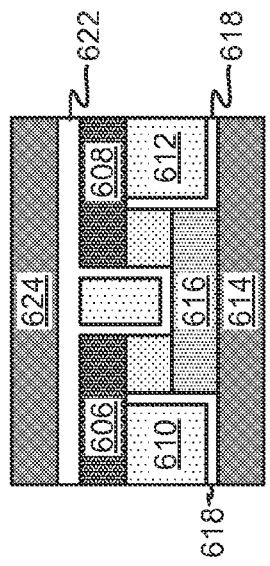

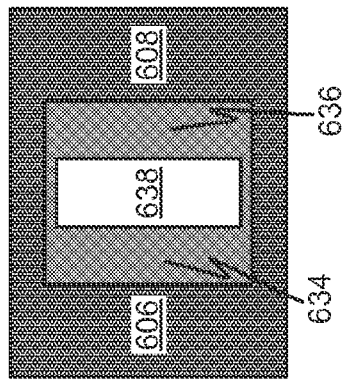
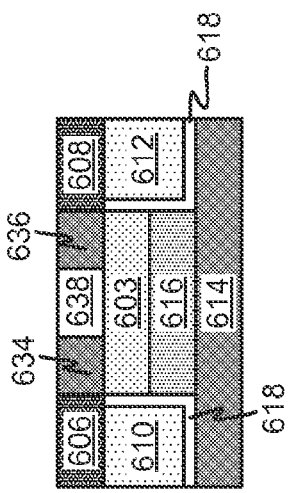
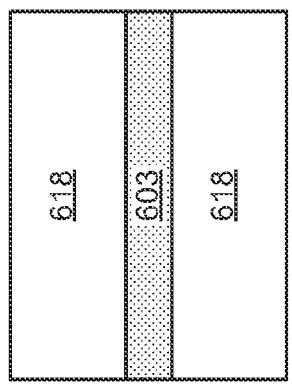
FIG. 10B
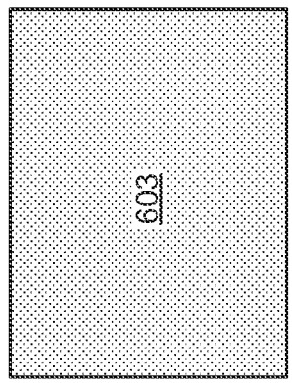
FIG. 10A
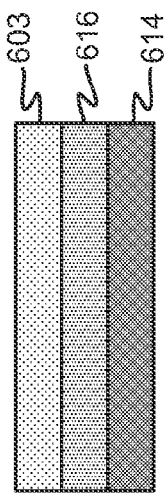

MULTI-SENSOR READER STRUCTURE HAVING A CURRENT PATH WITH INCREASED SIZE TO REDUCE NOISE

FIELD OF THE INVENTION

The present invention relates to magnetic heads, and more particularly, this invention relates to a magnetic head having a multi-sensor reader with increased current path size.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in a limited area and volume. A technical approach to meeting this desire is to increase the capacity by increasing the recording density of the HDD. To achieve higher recording density, further miniaturization of recording bits is effective, which in turn typically requires the design of smaller and smaller components.

Magnetoresistive effect type magnetic heads are employed as sensors for reading magnetic information (data) recorded on a magnetic recording medium (such as a hard disk) in high-density magnetic recording devices (such as HDDs). The use of magnetic read heads that utilize a magnetoresistive effect has become commonplace. One such magnetoresistive effect type read head uses a giant magnetoresistive (GMR) effect in a multi-layered film formed by laminating a ferromagnetic metal layer on a non-magnetic intermediate layer. The first kind of GMR heads employed were Current-In-Plane (CIP)-type heads in which electrical signals flow in parallel with the film plane to the sensor membrane. Next, Tunneling Magnetoresistive (TMR)-effect heads and Current-Perpendicular-To-Plane (CPP)-GMR heads, which are considered advantageous from the standpoint of track narrowing, gap narrowing, and increased output, were developed with improved recording density in mind.

While the demand in recent years for even higher density recording has been met by techniques based on narrowing the effective track width of a magnetoresistive sensor, this track width narrowing has resulted in other problems of increased element resistance, increased noise, lowered sensitivity, and difficulties in increasing the sensitivity.

Multi-element reader structures designed to accommodate higher density recording have been proposed to alleviate these problems. Multi-element readers are advantageous in that they allow for a magnetic head with a large number of elements of a size greater than a bit size of the medium, and this allows for bit data to be read from the difference in the plurality of signals produced thereby. Because the element size may be increased beyond a single bit size, noise is able to be suppressed and sensitivity is able to be increased. However, multi-element readers have high interconnection resistance, so the signal-to-noise ratio (SNR) of these readers is low, in comparison to typical single element readers, due in major part to resistance noise.

Single sensor reader structures connect using a wide upper shield, so interconnection resistance of a single sensor reader is low. However, multi-sensor readers are not able to utilize the same connection point using the upper shield, therefore multi-sensor readers connect via individual current path layers. As a result, interconnection resistance for the multi-sensor readers is high in comparison to single-sensor readers.

SUMMARY

According to one embodiment, a multi-sensor reader structure includes a lower magnetic shield layer positioned at a media-facing surface of the structure, a pinned layer positioned above the lower magnetic shield layer at the media-facing surface of the structure, at least two magnetoresistive (MR) elements positioned above the pinned layer and separated from one another in a cross-track direction by an inner layer, each MR element extending in an element height direction away from the media-facing surface of the structure by a first length, bias layers positioned on outside edges of the MR elements and the pinned layer, each bias layer extending in the element height direction away from the media-facing surface of the structure by a second length, and current paths positioned above and in electrical communication with the bias layers on either side of the inner layer, each current path extending in the element height direction away from the media-facing surface of the structure by a third length, wherein the third length is greater than the first length.

In another embodiment, a magnetic head includes a lower magnetic shield layer positioned at a media-facing surface of the head, a pinned layer positioned above the lower magnetic shield layer at the media-facing surface of the head, at least two MR elements positioned above the pinned layer and separated from one another in a cross-track direction by an inner layer, each MR element extending in an element height direction away from the media-facing surface of the head by a first length, bias layers positioned on outside edges of the MR elements and the pinned layer, each bias layer extending in the element height direction away from the media-facing surface of the head by a second length, and current paths positioned above and in electrical communication with the bias layers on either side of the inner layer, each current path extending in the element height direction away from the media-facing surface of the head by a third length, wherein the third length is at least three times the first length.

According to another embodiment, a method for forming a multi-sensor magnetic head includes forming a lower magnetic shield layer at a media-facing surface of the head, forming a pinned layer above the lower magnetic shield layer at the media-facing surface of the head, forming at least two MR elements above the pinned layer and separated from one another in a cross-track direction by an inner layer, each MR element extending in an element height direction away from a media-facing surface of the head by a first length, forming bias layers on outside edges of the MR elements and the pinned layer, each bias layer extending in the element height direction away from the media-facing surface of the head by a second length, and forming current paths above and in electrical communication with the bias layers on either side of the inner layer, each current path extending in the element height direction away from the media-facing surface of the head by a third length, wherein the at least two MR elements are positioned at a media-facing surface of the head, and wherein the third length is greater than the first length to reduce an electrical resistance of the current paths.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 8A-8F show various structures formed in a method for manufacturing a multi-sensor reader structure according to one embodiment.

FIGS. 9A-9F show various structures formed in a method for manufacturing a multi-sensor reader structure according to one embodiment.

FIGS. 10A-10F show various structures formed in a method for manufacturing a multi-sensor reader structure according to one embodiment.

DETAILED DESCRIPTION

Figure 1:
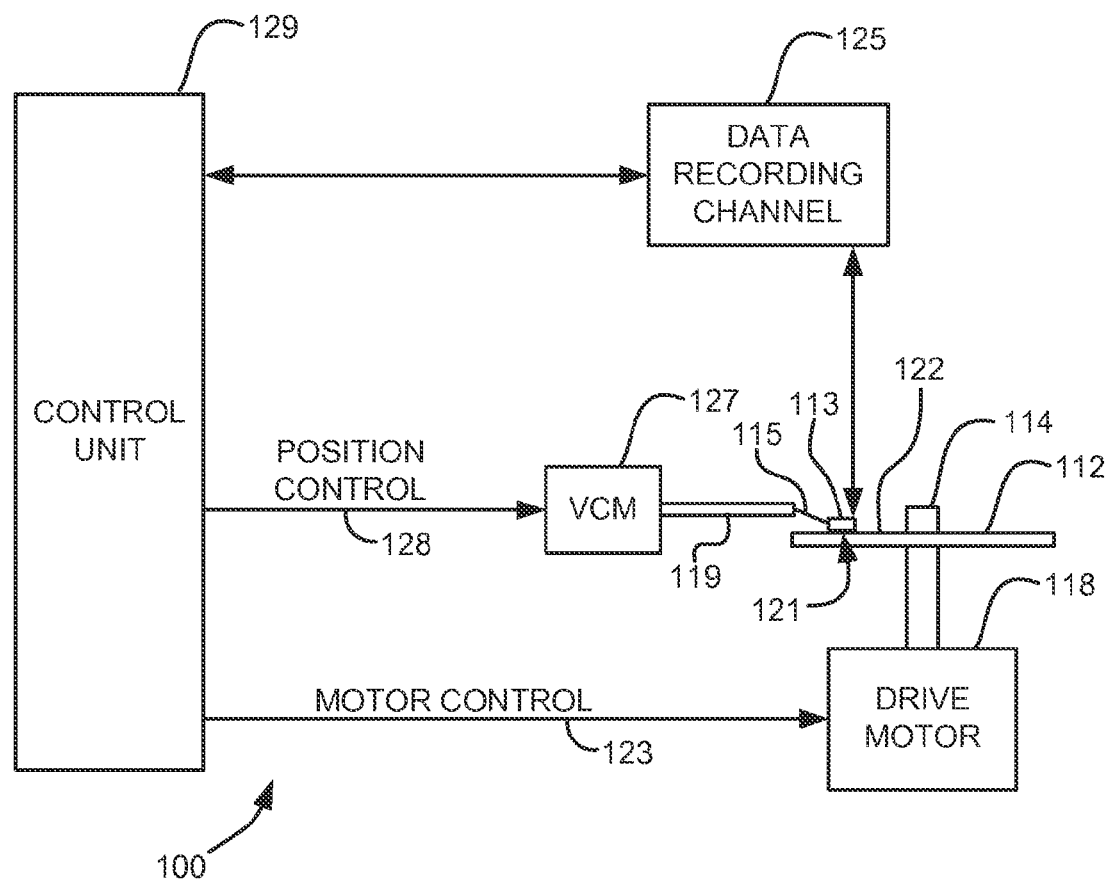
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

According to one general embodiment, a multi-sensor reader structure includes a lower magnetic shield layer positioned at a media-facing surface of the structure, a pinned layer positioned above the lower magnetic shield layer at the media-facing surface of the structure, at least two magnetoresistive (MR) elements positioned above the pinned layer and separated from one another in a cross-track direction by an inner layer, each MR element extending in an element height direction away from the media-facing surface of the structure by a first length, bias layers positioned on outside edges of the MR elements and the pinned layer, each bias layer extending in the element height direction away from the media-facing surface of the structure by a second length, and current paths positioned above and in electrical communication with the bias layers on either side of the inner layer, each current path extending in the element height direction away from the media-facing surface of the structure by a third length, wherein the third length is greater than the first length.

In another general embodiment, a magnetic head includes a lower magnetic shield layer positioned at a media-facing surface of the head, a pinned layer positioned above the lower magnetic shield layer at the media-facing surface of the head, at least two MR elements positioned above the pinned layer and separated from one another in a cross-track direction by an inner layer, each MR element extending in an element height direction away from the media-facing surface of the head by a first length, bias layers positioned on outside edges of the MR elements and the pinned layer, each bias layer extending in the element height direction away from the media-facing surface of the head by a second length, and current paths positioned above and in electrical communication with the bias layers on either side of the inner layer, each current path extending in the element height direction away from the media-facing surface of the head by a third length, wherein the third length is at least three times the first length.

According to another general embodiment, a method for forming a multi-sensor magnetic head includes forming a lower magnetic shield layer at a media-facing surface of the head, forming a pinned layer above the lower magnetic shield layer at the media-facing surface of the head, forming at least two MR elements above the pinned layer and separated from one another in a cross-track direction by an inner layer, each MR element extending in an element height direction away from a media-facing surface of the head by a first length, forming bias layers on outside edges of the MR elements and the pinned layer, each bias layer extending in the element height direction away from the media-facing surface of the head by a second length, and forming current paths above and in electrical communication with the bias layers on either side of the inner layer, each current path extending in the element height direction away from the media-facing surface of the head by a third length, wherein the at least two MR elements are positioned at a media-facing surface of the head, and wherein the third length is greater than the first length to reduce an electrical resistance of the current paths.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap may be formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disk in this instance, comprises basically a supporting substrate 200 of a suitable non-magnetic material such as aluminum or glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing side 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing side 318. The media facing side 318 is indicated across the right side of the structure.

Perpendicular writing is achieved by forcing flux through the stitch pole 308 into the main pole 306 and then to the surface of the disk positioned towards the media facing side 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing side 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing side 418). The media facing side 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown away from the media facing side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Figure 5A:
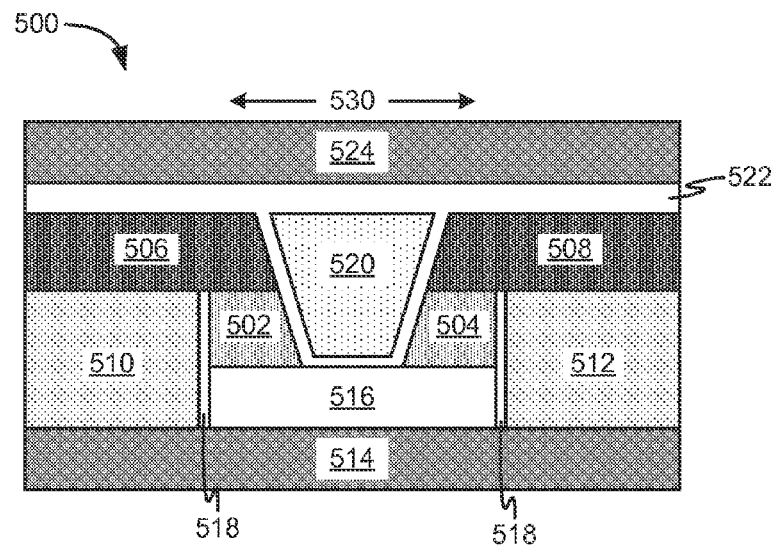
FIG. 5A shows a multi-sensor reader structure according to the prior art as seen from a media-facing surface thereof.
Figure 5B:
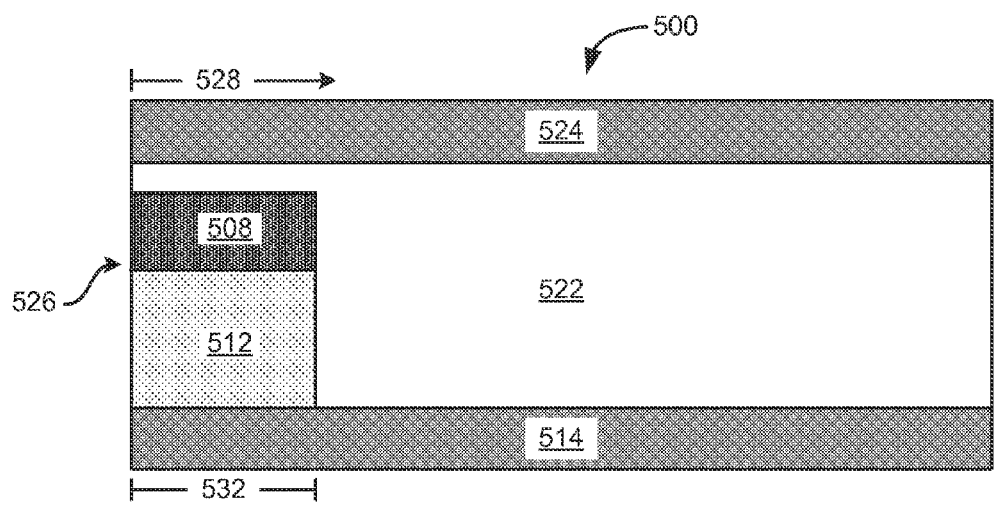
FIG. 5B shows a side view of a multi-sensor reader structure according to the prior art.

A multi-sensor reader structure 500 is shown from a media-facing surface in FIG. 5A and from a side view in FIG. 5B according to the prior art. An inherent problem in the multi-sensor reader 500 is that although it allows for the formation of each reader element 502, 504 to have a size greater than a recording bit size, the first current path 506 and the second current path 508, which are configured for separately extracting signals from their respective elements, first element 502 and second element 504, have a limited volume due to the positioning of the other components in the multi-sensor reader 500. This causes the electrical resistance of the reader elements 502, 504 and the current paths 506, 508 to be high, which reduces the signal-to-noise ratio (SNR) of the multi-sensor reader 500 due to resistance noise in the current paths 506, 508.

The multi-sensor reader structure 500 also includes bias layers 510, 512 positioned on sides in a cross-track direction 530 of the MR elements 502, 504, but not necessarily in contact therewith, and a lower shield 514 disposed below the bias layers 510, 512 and a pinned layer 516, with the pinned layer 516 being configured to provide a pinned magnetization direction for the MR elements 502, 504. An insulating layer 518 may be positioned between the bias layers 510, 512 and the pinned layer 516, in one embodiment. The insulating layer 518 may also be positioned between the bias layers 510, 512 and the MR elements 502, 504 in an embodiment.

The bias layers 510, 512 may include hard bias materials, soft bias materials, or some combination thereof, such as in a stacked or laminated structure. Therefore, the bias layers 510, 512 may be hard bias layers or soft bias layers, depending on the materials used, and manufacturing processes used to treat the materials.

The multi-sensor reader structure 500 may also include an insulating layer 522 positioned above the current paths 506, 508, with the insulating layer 522 being positioned around a inner layer 520 which may be used to backfill an etched portion of the structure which may comprise the same or different material than the insulating layer 522. An upper shield 524 may be positioned above the insulating layer 522.

As can be seen in FIG. 5B, the current path 508 (and the bias layer 512) do not extend beyond a height 532 of the MR elements and pinned layer in the element height direction 528 from the media-facing surface 526. This causes the volume of the current paths to be limited, thereby increasing the electrical resistance of these layers in operation.

The various layers described in FIGS. 5A-5B may comprise conventional materials as would be understood to one of skill in the art. For example, the insulating layers 518, 522 may comprise alumina, MgO, and/or some other suitable non-magnetic electrically insulative material.

In one embodiment, the current paths 506, 508 may function as electrical current paths/leads. In a further embodiment, the current paths 506, 508 may function as electrical current paths/leads and as magnetic shields. The current paths 506, 508 may comprise NiFe and/or some other suitable material known in the art.

Figure 5C:
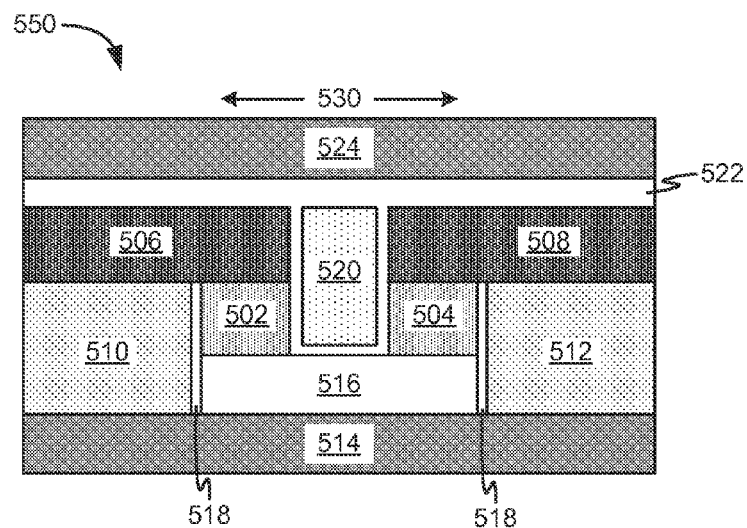
FIG. 5C shows a multi-sensor reader structure according to the prior art as seen from a media-facing surface thereof.
Figure 5D:
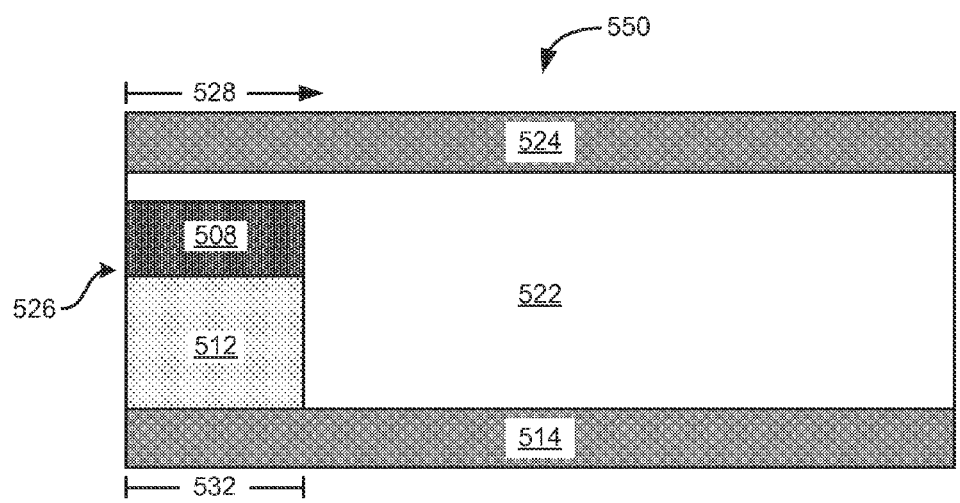
FIG. 5D shows a side view of a multi-sensor reader structure according to the prior art.

Now referring to FIGS. 5C-5D, another multi-sensor reader structure 550 is shown from a media-facing surface in FIG. 5C and from a side view in FIG. 5D according to the prior art. The layers in this structure are the same as for the structure 500 shown in FIGS. 5A-5B, except that in FIGS. 5C-5D, the multi-sensor reader structure 550 includes MR elements 502, 504 having vertical or substantially vertical side walls, thereby resulting in rectangular cross-sectional profiles for the MR elements 502, 504. Additionally, the inner layer 520 has a rectangular cross-section due to the vertical side walls of the MR elements 502, 504. However, just as in the previous structure 500 shown in FIGS. 5A-5B, in FIGS. 5C-5D, the multi-sensor reader structure 550 includes current paths (current path 508 as shown, but also current path 506), and bias layers (bias layer 512 as shown, but also bias layer 510) which do not extend beyond the MR elements 502, 504 and pinned layer 516 in the element height direction 528. This causes the volume of the current paths 506, 508 to be limited, thereby increasing the electrical resistance of these layers in operation.

The various layers described in FIGS. 5C-5D may comprise conventional materials as would be understood to one of skill in the art. For example, the bias layers 510, 512 may comprise CoFe, and/or some other suitable hard magnetic material.

Of course, other shapes for the inner layer, MR elements, and current paths may be used in addition to and/or in place of the shapes shown in FIGS. 5A-5D, as would be appreciated by one of skill in the art upon reading the present descriptions.

Figure 6A:
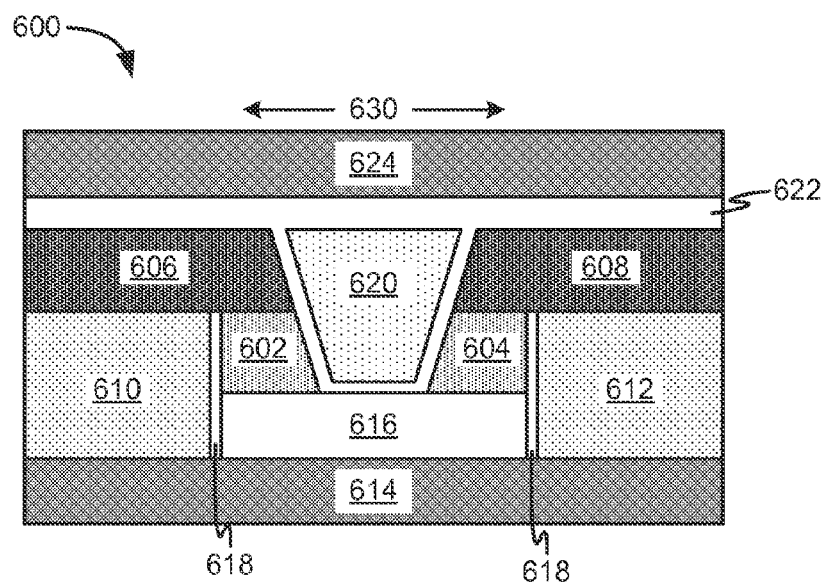
FIG. 6A shows a multi-sensor reader structure according to one embodiment as seen from a media-facing surface thereof.
Figure 6B:
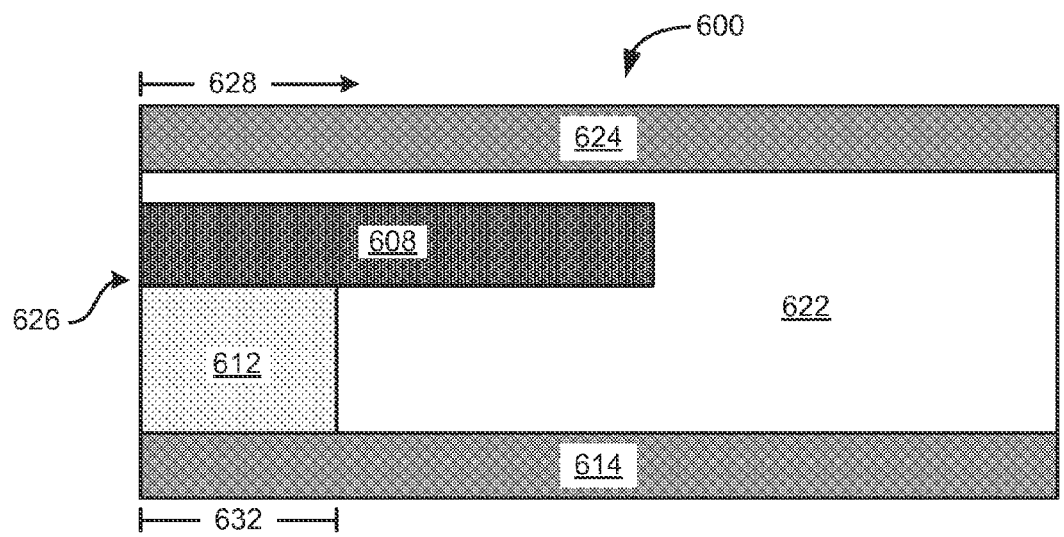
FIG. 6B shows a side view of a multi-sensor reader structure according to one embodiment.

FIG. 6A shows a multi-sensor reader structure 600 as seen from a media-facing surface of the structure, such as an ABS thereof, according to one embodiment. FIG. 6B shows a side view of the multi-sensor reader structure 600 according to an embodiment.

Now referring to FIGS. 6A-6B, the multi-sensor reader structure 600 includes bias layers 610, 612 positioned on sides of the MR elements 602, 604 in a cross-track direction 630, but not necessarily in contact therewith, and a lower magnetic shield layer 614 disposed below the bias layers 610, 612 and a pinned layer 616, with the pinned layer 616 being configured to provide a pinned magnetization direction for the MR elements 602, 604. The bias layers 610, 612 may also be positioned on sides of the pinned layer 616 in the cross-track direction 630, although not in direct contact therewith.

An insulating layer 618 may be positioned between the bias layers 610, 612 and the pinned layer 616, in one embodiment. The insulating layer 618 may also be positioned between the bias layers 610, 612 and the respective MR elements 602, 604 in an embodiment.

The MR elements 602, 604 may be read sensors of a type known in the art, in one embodiment.

The multi-sensor reader structure 600 may also include an insulating layer 622 positioned above the current paths 606, 608, with the insulating layer 622 being positioned around a inner layer 620 which may be used to backfill an etched portion of the structure which may comprise the same or different material than the insulating layer 622. An upper magnetic shield layer 624 may be positioned above the insulating layer 622.

As can be seen in FIG. 6B, the current path 608 extends beyond a height 632 of the MR elements and pinned layer in the element height direction 628 from the media-facing surface 626. This causes the volume of the current paths to be greater than in the limited conventional structure shown in FIGS. 5A-5D, thereby decreasing the electrical resistance of these layers in operation, in comparison to the conventional structure.

The various layers described in FIGS. 6A-6B may comprise conventional materials as would be understood to one of skill in the art. For example, the MR elements 602, 604 may comprise any suitable magnetic material known in the art, such as CoFe, CoFeB, NiFe, some combination thereof, etc.

In one embodiment, the current paths 606, 608 may function as electrical current paths/leads. In a further embodiment, the current paths 606, 608 may function as electrical current paths/leads and as magnetic shields. In this embodiment, the resolution and the SNR may be improved as compared to conventional structures, and the electric current paths 606, 608 may comprise NiFe and/or some other suitable material known in the art.

Figure 6C:
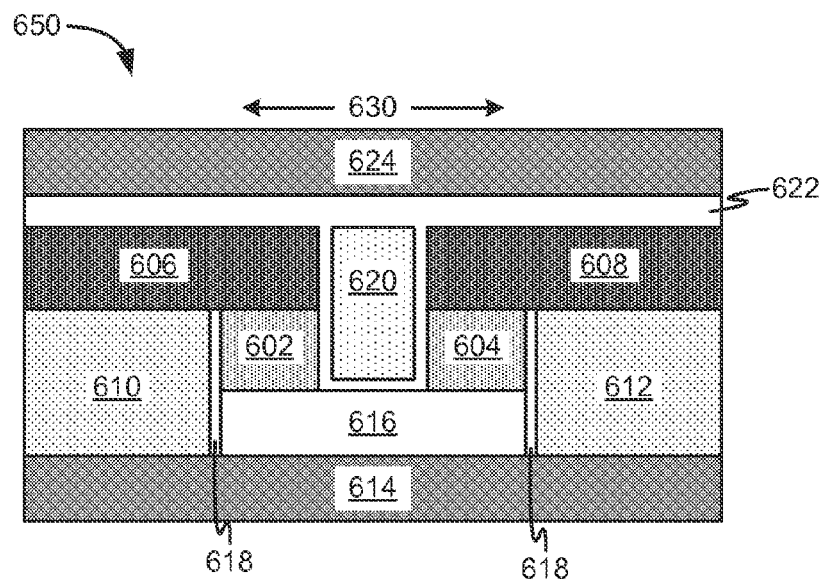
FIG. 6C shows a multi-sensor reader structure according to one embodiment as seen from a media-facing surface thereof.
Figure 6D:
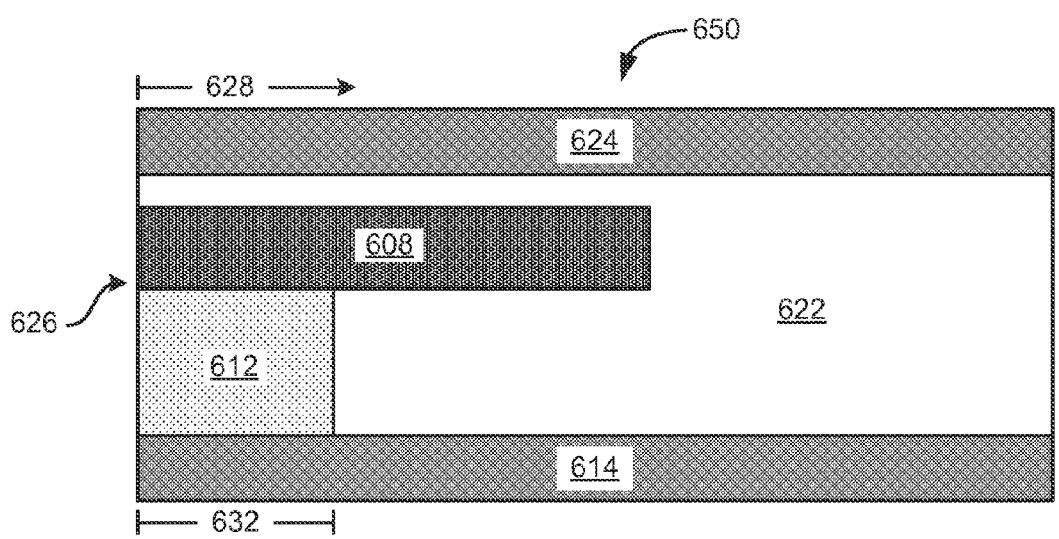
FIG. 6D shows a side view of a multi-sensor reader structure according to one embodiment.

Now referring to FIGS. 6C-6D, another multi-sensor reader structure 650 is shown from a media-facing surface in FIG. 6C and from a side view in FIG. 6D according to one embodiment. The layers in this structure are the same as for the structure 600 shown in FIGS. 6A-6B, except that in FIGS. 6C-6D, the multi-sensor reader structure 650 includes MR elements 602, 604 having vertical or substantially vertical side walls, thereby resulting in rectangular cross-sectional profiles for the MR elements 602, 604. Additionally, the inner layer 620 has a rectangular cross-section due to the vertical side walls of the MR elements 602, 604. Also, just as in the previous structure 600 shown in FIGS. 6A-6B, in FIGS. 6C-6D, the multi-sensor reader structure 650 includes current paths (current path 608 as shown, but also current path 606) which extend beyond a height 632 of one or both of the MR elements 602, 604 and pinned layer 616 in the element height direction 628. This causes the volume of the current paths 606, 608 to be greater than in the conventional structure, thereby decreasing the electrical resistance of these layers in operation.

The various layers described in FIGS. 6C-6D may comprise conventional materials as would be understood to one of skill in the art. For example, the pinned layer 616 may comprise CoFe, CoFeB, and/or some other suitable pinned magnetic material.

Figure 6E:
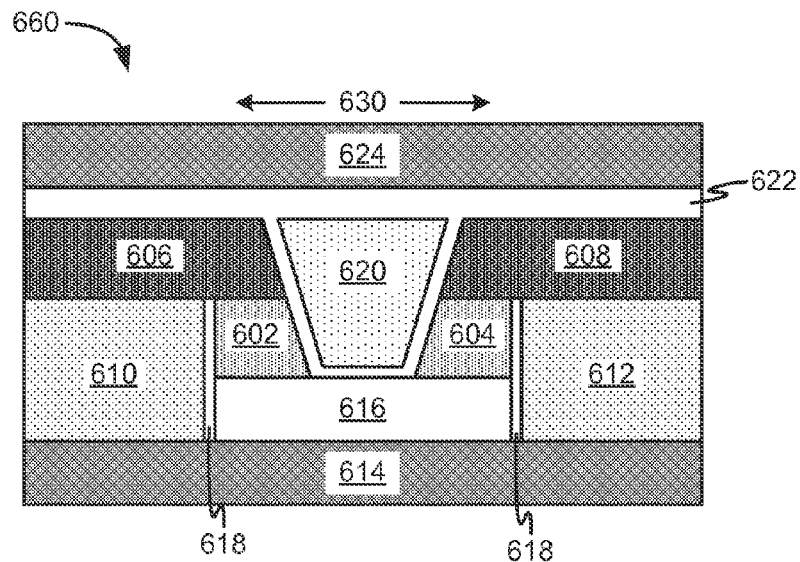
FIG. 6E shows a multi-sensor reader structure according to one embodiment as seen from a media-facing surface thereof.
Figure 6F:
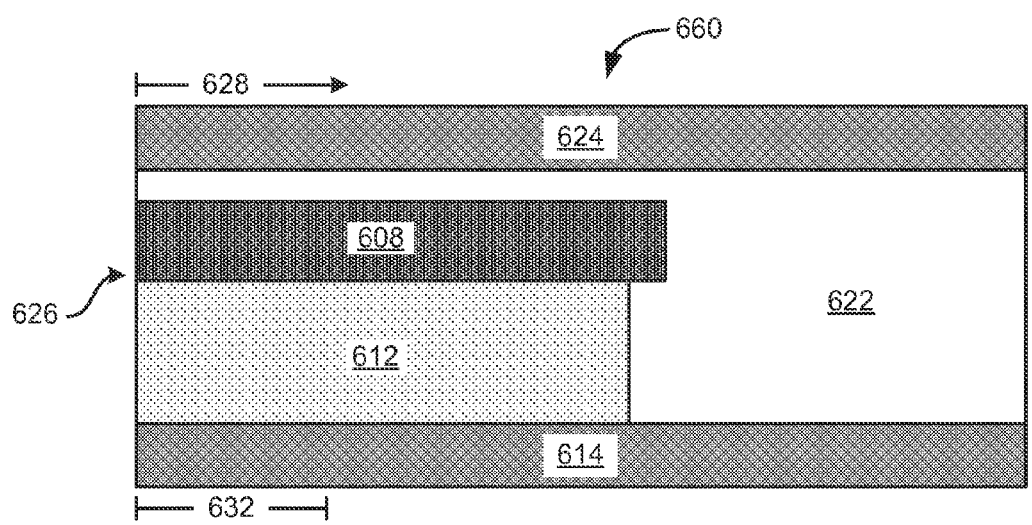
FIG. 6F shows a side view of a multi-sensor reader structure according to one embodiment.

Now referring to FIGS. 6E-6F, another multi-sensor reader structure 660 is shown from a media-facing surface in FIG. 6E and from a side view in FIG. 6F according to one embodiment. The layers in this structure are the same as for the structure 600 shown in FIGS. 6A-6B. However, in FIGS. 6E-6F, the multi-sensor reader structure 660 includes current paths (current path 608 as shown, but also current path 606) and bias layers (bias layer 612 as shown, but also bias layer 610) which extend beyond the height 632 of one or both of the MR elements 602, 604 and pinned layer 616 in the element height direction 628.

As shown, the current paths extend farther from the media-facing surface 626 than one or both of the bias layers; however, these layers may extend the same amount from the media-facing surface 626, the current paths may extend beyond the bias layers, or the bias layers may extend beyond one or both of the current paths, in various embodiments. This causes the volume of the current paths 606, 608 to be greater than in the conventional structure, thereby decreasing the electrical resistance of these layers in operation. This also allows for an easier construction of the structure during manufacturing.

The various layers described in FIGS. 6E-6F may comprise conventional materials as would be understood to one of skill in the art. For example, the inner layer 620 may comprise an electrically and/or magnetically insulating material of a type known in the art, a ferromagnetic material of a type known in the art, and/or a soft magnetic material of a type known in the art.

In one embodiment, the current paths 606, 608 may function solely as electrical current paths/leads. In a further embodiment, the current paths 606, 608 may function as electrical current paths/leads and as magnetic shields. In this embodiment, the resolution and the SNR may be improved as compared to conventional structures, and the current paths 606, 608 may comprise NiFe, an alloy of NiFe, and/or some other suitable material known in the art.

In one specific embodiment, the inner layer 620 may comprise one or more ferromagnetic materials, such as Ni, Co, Fe, $Fe_2O_3$, MnSb, combinations thereof, etc.

Figure 6G:
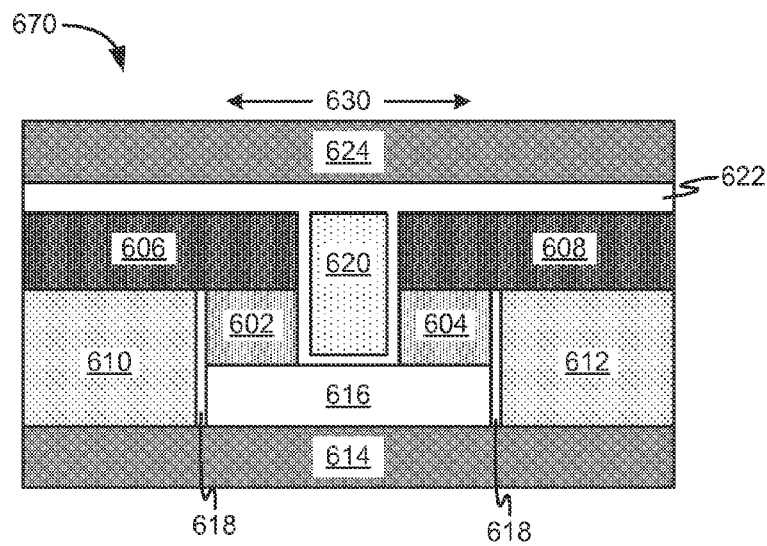
FIG. 6G shows a multi-sensor reader structure according to one embodiment as seen from a media-facing surface thereof.
Figure 6H:
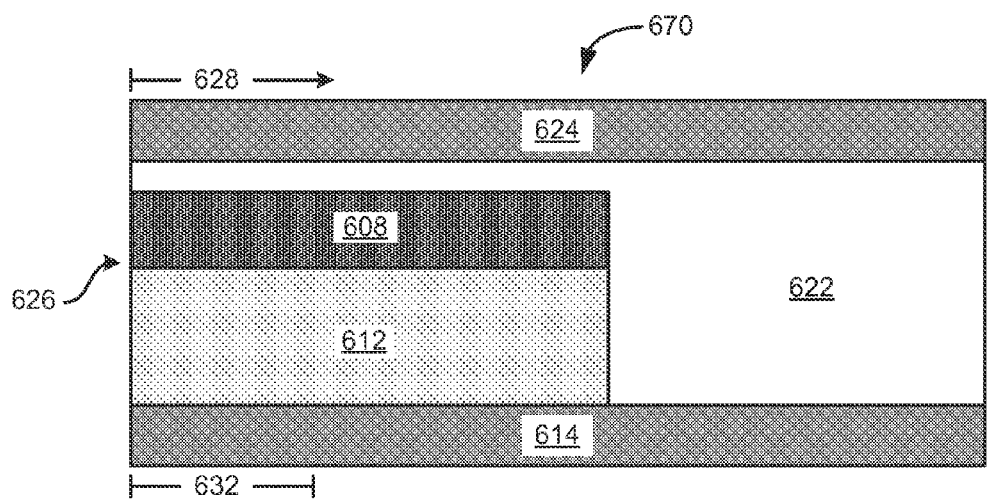
FIG. 6H shows a side view of a multi-sensor reader structure according to one embodiment.

Now referring to FIGS. 6G-6H, another multi-sensor reader structure 670 is shown from a media-facing surface in FIG. 6G and from a side view in FIG. 6H according to one embodiment. The layers in this structure are the same as for the structure 650 shown in FIGS. 6C-6D. However, in FIGS. 6G-6H, the multi-sensor reader structure 670 includes current paths (current path 608 as shown, but also current path 606) and bias layers (bias layer 612 as shown, but also bias layer 610) which extend beyond the height 632 of one or both of the MR elements 602, 604 and pinned layer 616 in the element height direction 628. Furthermore, as opposed to the inner layer 620 in the reader structure 660 of FIG. 6E-6F which has slanted sidewalls, in FIGS. 6G-6H, the multi-sensor reader structure 670 includes an inner layer 620 which has vertical sidewalls.

As shown, the current paths extend the same amount from the media-facing surface 626 as the bias layers; however, the current paths may extend beyond one or both of the bias layers, or the bias layers may extend beyond one or both of the current paths, in various other embodiments. This causes the volume of the current paths 606, 608 to be greater than in the conventional structure, thereby decreasing the electrical resistance of these layers in operation. This also allows for an easier construction of the structure during manufacturing.

The various layers described in FIGS. 6G-6H may comprise conventional materials as would be understood to one of skill in the art.

Figures 6I, 6J:
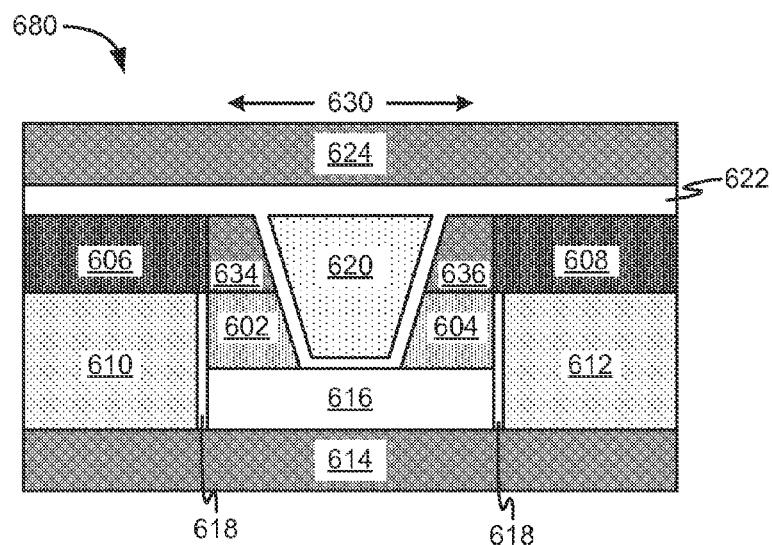
FIG. 6I shows a multi-sensor reader structure according to one embodiment as seen from a media-facing surface thereof.
FIG. 6J shows a side view of a multi-sensor reader structure according to one embodiment.

Now referring to FIGS. 6I-6J, another multi-sensor reader structure 680 is shown from a media-facing surface in FIG. 6I and from a side view in FIG. 6J according to one embodiment. The layers in this structure are the same as for the structure 660 shown in FIGS. 6E-6F. However, in FIGS. 6I-6J, the multi-sensor reader structure 680 includes electric continuity mask layers 634, 636 which extend along sides of the bias layers 610, 612 to electrically connect the bias layers 610, 612 to the MR elements 602, 604. This allows for more efficient manufacturing of the multi-sensor reader structure, in this embodiment.

The various layers described in FIGS. 6I-6J may comprise conventional materials as would be understood to one of skill in the art. For example, the electric continuity mask layers 634, 636 may comprise an electrically conductive material of a type known in the art, such as Ru, W, Ir, Cr, Rh, and/or an alloy comprising a majority of one or more of Ru, W, Ir, Cr, and/or Rh, a majority being greater than about 50% by weight and/or by volume.

In one embodiment, the electric continuity mask layers 634, 636 and current paths 606, 608 may function as electrical current paths/leads. In a further embodiment, the electric continuity mask layers 634, 636 and current paths 606, 608 may function as electrical current paths/leads and as magnetic shields. In this embodiment, the resolution and the SNR may be improved as compared to conventional structures, and the electric continuity mask layers 634, 636 and current paths 606, 608 may comprise NiFe and/or some other suitable material known in the art.

Figure 6K:
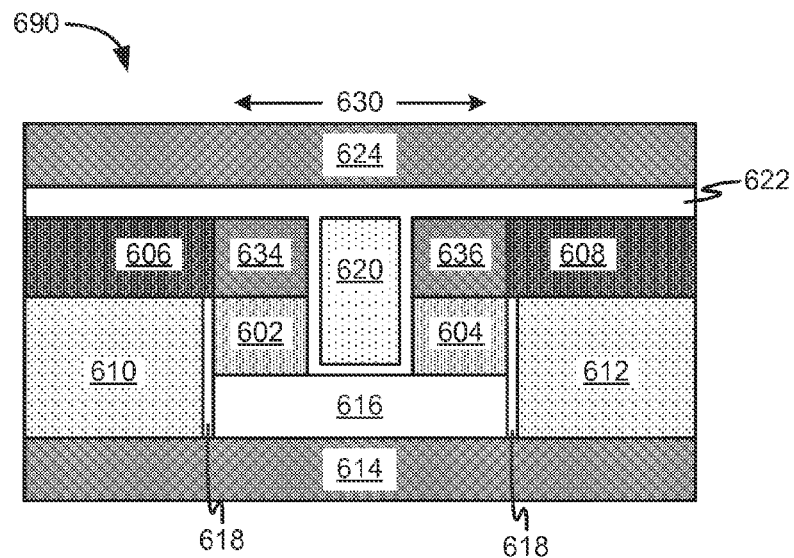
FIG. 6K shows a multi-sensor reader structure according to one embodiment as seen from a media-facing surface thereof.
Figure 6L:
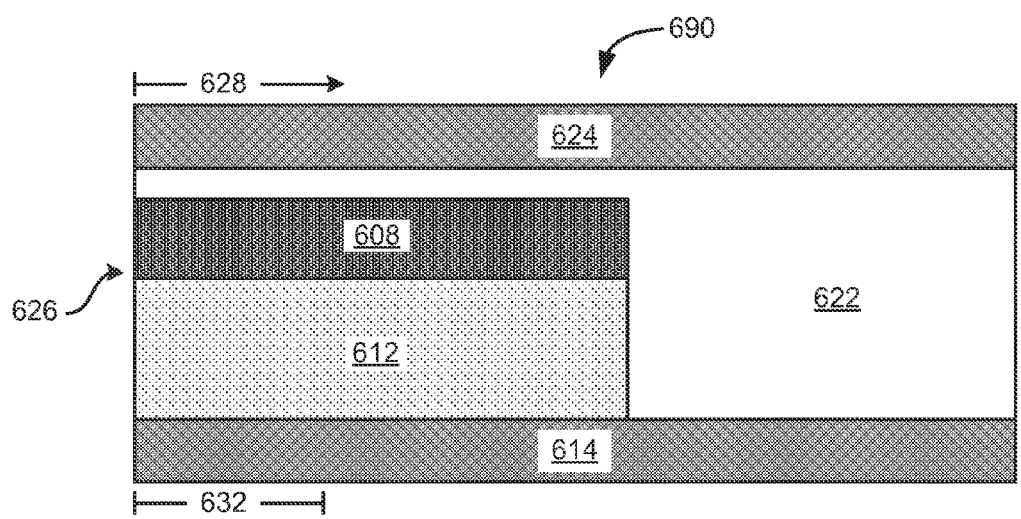
FIG. 6L shows a side view of a multi-sensor reader structure according to one embodiment.

Now referring to FIGS. 6K-6L, another multi-sensor reader structure 690 is shown from a media-facing surface in FIG. 6K and from a side view in FIG. 6L according to one embodiment. The layers in this structure are the same as for the structure 680 shown in FIGS. 6I-6J. However, in FIGS. 6K-6L, the multi-sensor reader structure 690 includes vertical side walls on the various components, because the inner layer 620 does not have slanted side walls, like that in FIGS. 6I-6J. Furthermore, in FIGS. 6I-6J, the current paths 606, 608 extend beyond the bias layers 610, 612 in the element height direction 628, whereas in FIGS. 6K-6L, the current paths 606, 608 extend in the element height direction 628 about a same distance as the bias layers 610, 612.

Of course, other shapes for the inner layer 620, MR elements 602, 604, and current paths 606, 608 may be used in addition to and/or in place of the shapes shown in FIGS. 6A-6L, as would be appreciated by one of skill in the art upon reading the present descriptions.

Figure 6M:
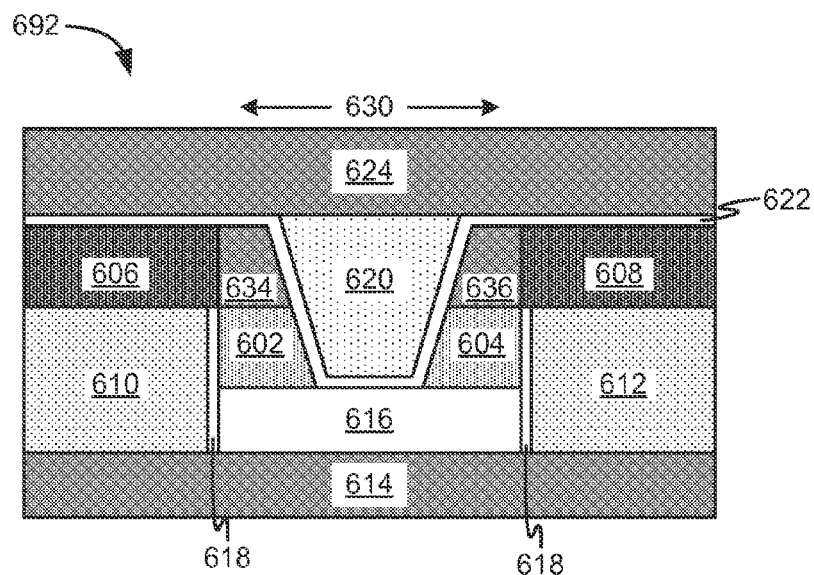
FIG. 6M shows a multi-sensor reader structure according to one embodiment as seen from a media-facing surface thereof.
Figure 6N:
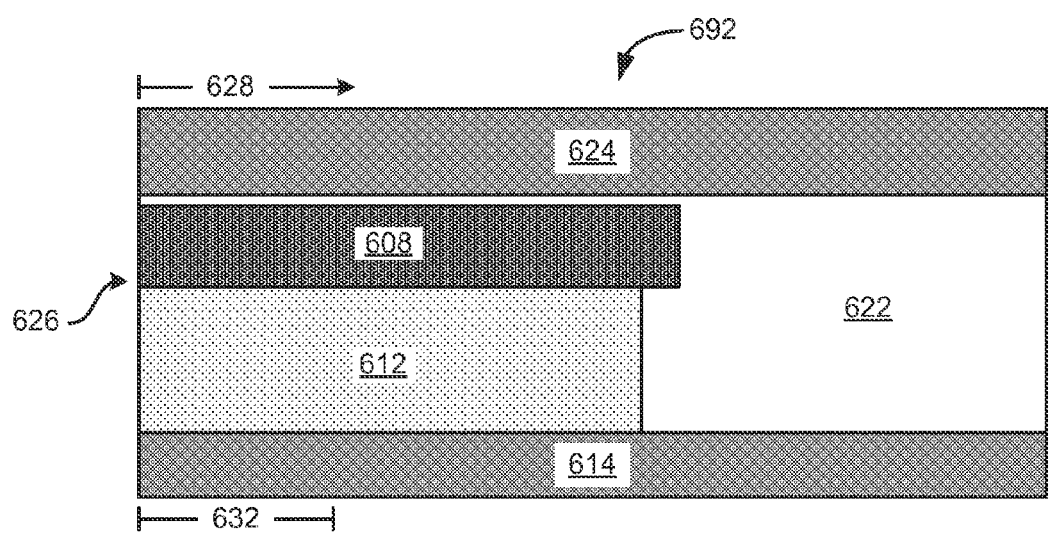
FIG. 6N shows a side view of a multi-sensor reader structure according to one embodiment.

Now referring to FIGS. 6M-6N, another multi-sensor reader structure 692 is shown from a media-facing surface in FIG. 6M and from a side view in FIG. 6N according to one embodiment. The layers in this structure are the same as for the structure 680 shown in FIGS. 6I-6J. However, in FIGS. 6M-6N, the inner layer 620 is in direct contact with and not separated from the upper magnetic shield layer 624 by the insulating layer 622. In this way, the inner layer 620 is configured to act as a magnetic shield.

In this embodiment, the multi-sensor reader structure 692 comprises an upper magnetic shield layer 624 positioned above the current paths 606, 608 and the inner layer 620, and a second insulating layer 622 is positioned between the upper magnetic shield layer 624 and each of the current paths 606, 608 (but not above the inner layer 620). Also, the inner layer 620 is configured to act as a magnetic shield in conjunction with the upper magnetic shield layer 624.

According to one embodiment, the inner layer 620 may comprise NiFe, an alloy of NiFe, a laminated structure comprising NiFe, and/or a laminated structure comprising NiFe and some other material or materials. Furthermore, the inner layer 620 may comprise any other suitable material known in the art that may be configured to act as a magnetic shield for the MR elements 602, 604.

Of course, other shapes for the electric continuity mask layers 634, 636, the inner layer 620, MR elements 602, 604, and current paths 606, 608 may be used in addition to and/or in place of the shapes shown in FIGS. 6M-6N, as would be appreciated by one of skill in the art upon reading the present descriptions.

In some approaches, a multi-sensor reader structure as shown in any of FIGS. 6A-6N may be used in a magnetic data storage system. The magnetic data storage system may be similar to that shown in FIG. 1. For example, the magnetic data storage system 100 may comprise at least one magnetic head 121 having a multi-sensor reader structure as described according to any embodiment herein, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

In one embodiment, a multi-sensor reader structure includes a lower magnetic shield layer positioned at a media-facing surface of the structure, a pinned layer positioned above the lower magnetic shield layer at the media-facing surface of the structure, at least two MR elements positioned above the pinned layer and separated from one another in a cross-track direction by an inner layer, each MR element extending in an element height direction away from the media-facing surface of the structure by a first length, bias layers disposed via an insulating layer on outside edges of the MR elements and the pinned layer (the insulating layer is positioned between each bias layer and a corresponding MR element, and between each bias layer and the pinned layer), each bias layer extending in the element height direction away from the media-facing surface of the structure by a second length, and current paths positioned above and in electrical communication with the bias layers on either side of the inner layer, each current path extending in the element height direction away from the media-facing surface of the structure by a third length, with the third length being greater than the first length (e.g., 1.5 times as great, 2 times as great, 3 times as great, 5 times as great, etc.).

In this structure, each MR element may include a barrier layer positioned above the pinned layer, and a free layer positioned above the barrier layer.

In another approach, the inner layer may have a rectangular cross-sectional shape when viewed from the media-facing surface of the structure, or an inverse trapezoidal cross-sectional shape when viewed from the media-facing surface of the structure.

The structure may include more than two MR elements, such as 4, 6, 8, etc., and the structure may include an upper magnetic shield layer disposed via a second insulating layer above the current paths and the inner layer, in one embodiment. The second insulating layer is positioned between the upper magnetic shield layer and each current path and the inner layer.

In another embodiment, the structure may include electric continuity layers positioned above and in electrical communication with the MR elements, each electric continuity layer being disposed via the second insulating layer on sides of the inner layer in the cross-track direction (the second insulating layer is positioned between the inner layer and each electric continuity layer), the electric continuity layers being configured to electrically connect each current path with its respective MR element.

In addition, the third length may be at least three times the first length, the third length may be at least as great as the second length, the third length may be greater than the second length, and/or the second length may be greater than the first length.

In one embodiment, the multi-sensor reader structure may be incorporated in and/or may comprise a magnetic head.

Figure 7:
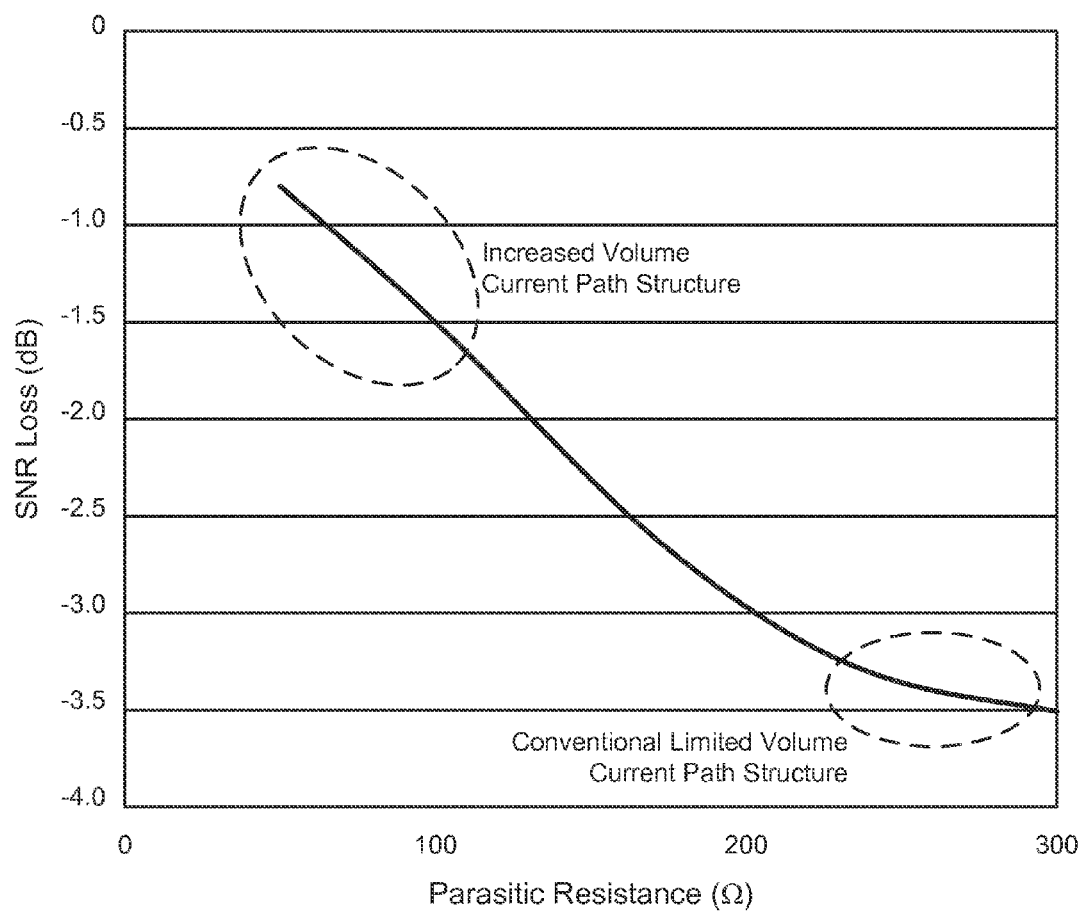
FIG. 7 shows an effect of parasitic resistance noise on signal-to-noise ratio (SNR).

Now referring to FIG. 7, the effect of parasitic resistance noise on SNR is shown, comparing a conventional structure with a structure according to one embodiment. As shown, a nominal +3 dB gain is accomplished using the multi-sensor reader structure described herein in various embodiments, as compared to a conventional multi-sensor reader structure which has a limited volume current path.

With reference to FIGS. 8A-8F, a method for manufacturing a multi-sensor reader structure is shown in various states of formation according to one embodiment. Each step in the manufacturing method will be described with reference to one or more figures, each figure including a view from the media-facing surface of the structure on the top, and a cross-sectional side view of the structure on the bottom.

With reference to FIG. 8A, a lower magnetic shield layer 614, which may comprise NiFe, CoFe, or some other suitable material known in the art, is formed using any formation technique known in the art, such as plating, sputtering atomic layer deposition (ALD), etc. The lower magnetic shield layer 614 may be provided by way of a film of $Al_2O_3$, MgO, etc., on an $Al_2O_3$—TiC wafer serving as a base body of a slider (not shown in the figures). Then, for example, a sputtering method or some other suitable formation technique may be employed to deposit a pinned layer 616 above the lower magnetic shield layer 614, the pinned layer 616 comprising any suitable material known in the art. Above the pinned layer 616, a free magnetic layer 603 is formed using any formation technique known in the art. The free magnetic layer 603 may comprise any suitable material known in the art, such as CoFe, NiFe, CoFeB, etc.

Next, as shown in FIG. 8B, outer track definition takes place by etching or otherwise removing outer portions of the free magnetic layer 603 and the pinned layer 616, and forming an insulating layer 618 therein using a sputtering method or some other suitable formation technique. Above the insulating layer 618, bias layers 610, 612 are formed on either sides of the free layer 603 in a cross-track direction. The bias layers 610, 612 may comprise any suitable material known in the art.

Then, as shown in FIG. 8C, the MR height is defined by etching or otherwise removing portions of the free magnetic layer 603, the bias layers 610, 612, and the pinned layer 616, outside of an area where the media-facing surface will be defined, and backfilling with more of the insulating layer 618.

Next, as shown in FIG. 8D, after forming the material for the current path layers 606, 608 above the structure, an inner track definition takes place by etching or otherwise removing an inner portion of the free magnetic layer 603, backfilling with a second insulating layer 622, and forming an inner layer 620 in the trench of the second insulating layer 622 along the track width of the structure. This process also divides the free layer 603 into separate MR elements 602, 604.

Then, as shown in FIG. 8E, current path formation takes place by defining an element height of each of the current paths 606, 608, followed by formation of more of the second insulating layer 622 thereon.

In FIG. 8F, formation of the upper magnetic shield layer 624 is shown which completes the formation process for the multi-sensor reader structure in this embodiment.

The MR elements 602, 604 may comprise any layers and materials known in the art. In one example, the MR elements 602, 604 may comprise at least a free layer and a barrier layer. More specifically, the MR elements 602, 604 may comprise, for example, a 1 nm Ta underlayer, a 5 nm IrMn antiferromagnetic (AFM) layer, a 2 nm CoFeB pinned layer, a MgO tunnel insulating film, and a free layer comprising a 5 nm CoFeB/2 nm NiFe laminated film.

Any suitable formation techniques known in the art may be used to form the various layers and shapes described in FIGS. 8A-8F, including but not limited to, mask patterning, double patterning, ArF exposure, ArF liquid immersion, extreme ultraviolet lithography (EUV), Ar ion milling, reactive ion etching (RIE), sputtering, long throw sputtering (LTS), lift-off, chemical mechanical polishing (CMP), and others not specifically described herein that are known in the art.

The method described in FIGS. 8A-8F is representative of the formation of one embodiment of a multi-sensor reader structure. Although two MR elements 602, 604 are shown, it is possible to form more than two MR elements in each read head, as would be understood by one of skill in the art, such as three, four, 10, 16, 24, 32, etc.

With reference to FIGS. 9A-9F, a method for manufacturing a multi-sensor reader structure is shown in various states of formation according to one embodiment. Each step in the manufacturing method will be described with reference to one or more figures, each figure including a view from the media-facing surface of the structure on the top, and a cross-sectional side view of the structure on the bottom.

Figure 9A:
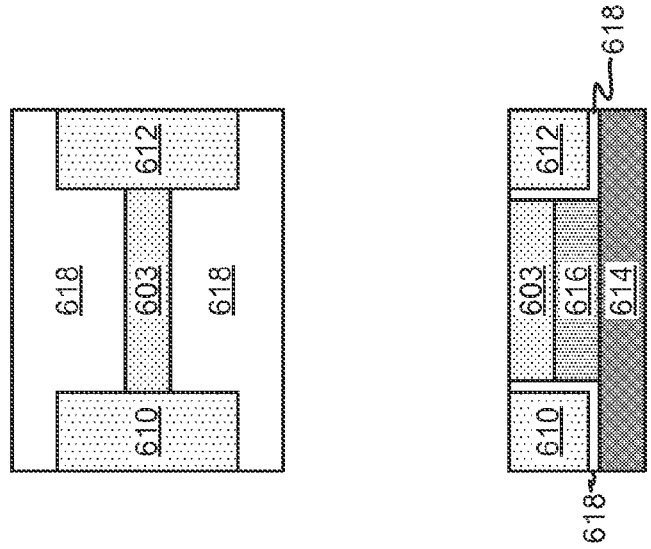

With reference to FIG. 9A, a lower magnetic shield layer 614, which may comprise NiFe, CoFe, or some other suitable material known in the art, is formed using any formation technique known in the art, such as plating, sputtering ALD, etc. The lower magnetic shield layer 614 may be provided by way of a film of $Al_2O_3$, MgO, etc., on an $Al_2O_3$—TiC wafer serving as a base body of a slider (not shown in the figures). Then, for example, a sputtering method or some other suitable formation technique may be employed to deposit a pinned layer 616 above the lower magnetic shield layer 614, the pinned layer 616 comprising any suitable material known in the art. Above the pinned layer 616, a free magnetic layer 603 is formed using any formation technique known in the art. The free magnetic layer 603 may comprise any suitable material known in the art, such as CoFe, NiFe, CoFeB, etc.

Figure 9B:
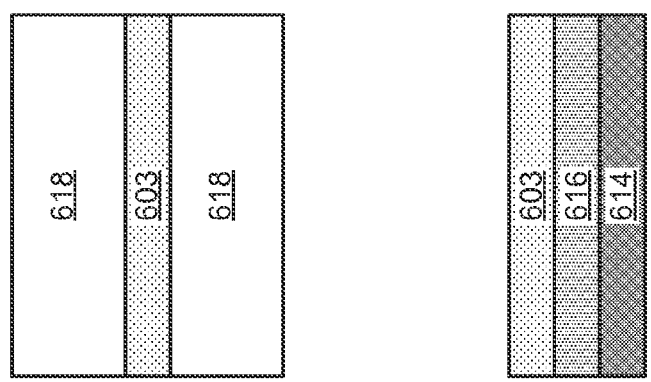

Then, as shown in FIG. 9B, the MR height is defined by etching or otherwise removing portions of the free magnetic layer 603 and the pinned layer 616, outside of an area where the media-facing surface will be defined, and backfilling with an insulating layer 618.

Figure 9C:
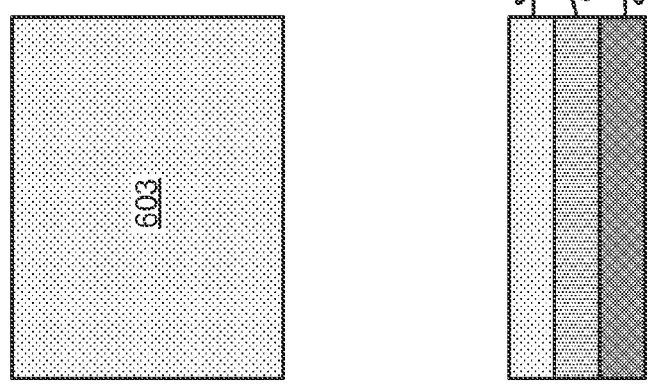

Next, as shown in FIG. 9C, outer track definition takes place by etching or otherwise removing outer portions of the free magnetic layer 603 and the pinned layer 616, and forming an insulating layer 618 therein using a sputtering method or some other suitable formation technique. Above the insulating layer 618, bias layers 610, 612 are formed on either sides of the free layer 603 in a cross-track direction. The bias layers 610, 612 may comprise any suitable material known in the art.

Next, as shown in FIG. 9D, after forming the material for the current path layers 606, 608 above the structure, an inner track definition takes place by etching or otherwise removing an inner portion of the free magnetic layer 603, backfilling with a second insulating layer 622, and forming an inner layer 620 in the trench of the second insulating layer 622 along the track width of the structure. This process also divides the free layer 603 into separate MR elements 602, 604.

Then, as shown in FIG. 9E, current path formation takes place by defining an element height of each of the current paths 606, 608, followed by formation of more of the second insulating layer 622 thereon.

In FIG. 9F, formation of the upper magnetic shield layer 624 is shown which completes the formation process for the multi-sensor reader structure in this embodiment.

The MR elements 602, 604 may comprise any layers and materials known in the art. In one example, the MR elements 602, 604 may comprise at least a free layer and a barrier layer. More specifically, the MR elements 602, 604 may comprise, for example, a 1 nm Ta underlayer, a 5 nm IrMn antiferromagnetic (AFM) layer, a 2 nm CoFeB pinned layer, a MgO tunnel insulating film, and a free layer comprising a 5 nm CoFeB/2 nm NiFe laminated film.

Any suitable formation techniques known in the art may be used to form the various layers and shapes described in FIGS. 9A-9F, including but not limited to, mask patterning, double patterning, ArF exposure, ArF liquid immersion, EUV, Ar ion milling, RIE, sputtering, LTS, lift-off, CMP, and others not specifically described herein that are known in the art.

The method described in FIGS. 9A-9F is representative of the formation of one embodiment of a multi-sensor reader structure. Although two MR elements 602, 604 are shown, it is possible to form more than two MR elements in each read head, as would be understood by one of skill in the art, such as three, four, 10, 16, 24, 32, etc.

With reference to FIGS. 10A-10F, a method for manufacturing a multi-sensor reader structure is shown in various states of formation according to one embodiment. Each step in the manufacturing method will be described with reference to one or more figures, each figure including a view from the media-facing surface of the structure on the top, and a cross-sectional side view of the structure on the bottom.

With reference to FIG. 10A, a lower magnetic shield layer 614, which may comprise NiFe, CoFe, or some other suitable material known in the art, is formed using any formation technique known in the art, such as plating, sputtering ALD, etc. The lower magnetic shield layer 614 may be provided by way of a film of $Al_2O_3$, MgO, etc., on an Al₂O₃—TiC wafer serving as a base body of a slider (not shown in the figures). Then, for example, a sputtering method or some other suitable formation technique may be employed to deposit a pinned layer 616 above the lower magnetic shield layer 614, the pinned layer 616 comprising any suitable material known in the art. Above the pinned layer 616, a free magnetic layer 603 is formed using any formation technique known in the art. The free magnetic layer 603 may comprise any suitable material known in the art, such as CoFe, NiFe, CoFeB, etc.

Then, as shown in FIG. 10B, the MR height is defined by etching or otherwise removing portions of the free magnetic layer 603 and the pinned layer 616, outside of an area where the media-facing surface will be defined, and backfilling with an insulating layer 618.

Next, as shown in FIG. 10C, outer track definition takes place by etching or otherwise removing outer portions of the free magnetic layer 603 and the pinned layer 616, and forming an insulating layer 618 therein using a sputtering method or some other suitable formation technique. Above the insulating layer 618, bias layers 610, 612 are formed on either sides of the free layer 603 in a cross-track direction. The bias layers 610, 612 may comprise any suitable material known in the art.

Furthermore, electric continuity layers 634, 636 are formed with the aid of a mask layer 638. The electric continuity layers 634, 636 may comprise any suitable electrically conductive material, such as Ru, W, Ir, Cr, Rh, and/or an alloy comprising a majority of one or more of Ru, W, Ir, Cr, and/or Rh. Also, current paths 606, 608 are formed above the bias layers 610, 612 and connect to the electric continuity layers 634, 636, which in turn connect to the free layer 603. These electric continuity layers 634, 636 are formed above side portions of the free layer 603 in the cross-track direction and define the inner most sides of the current paths 606, 608 in the final structure.

Figure 10D:
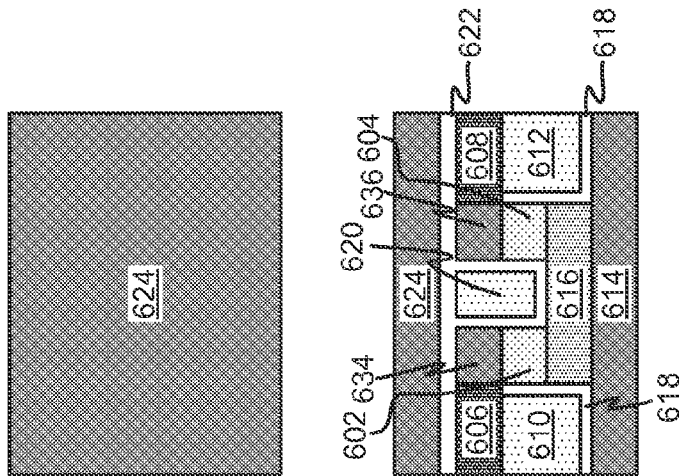

Next, as shown in FIG. 10D, an inner track definition takes place by etching or otherwise removing an inner portion of the free magnetic layer 603, backfilling with a second insulating layer 622, and forming an inner layer 620 in the trench of the second insulating layer 622 along the track width of the structure. This process also divides the free layer 603 into separate MR elements 602, 604.

Figure 10E:
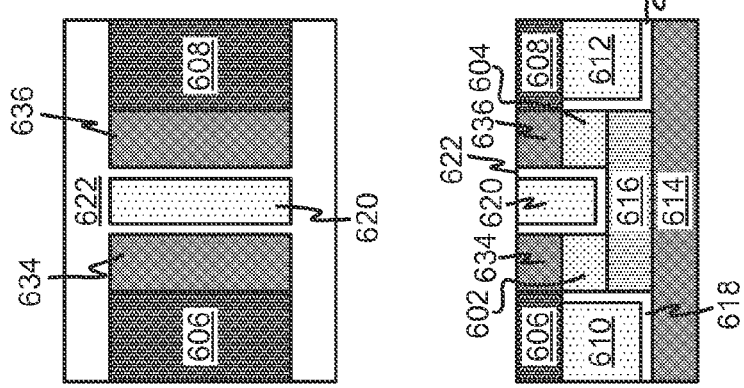

Then, as shown in FIG. 10E, current path formation takes place by defining an element height of each of the current paths 606, 608, followed by formation of more of the second insulating layer 622 in the removed portions thereof.

Figure 10F:
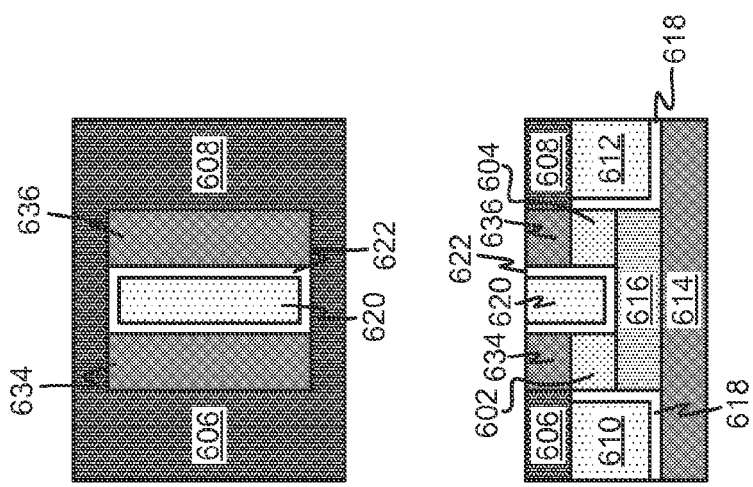

In FIG. 10F, formation of the upper magnetic shield layer 624 is shown which completes the formation process for the multi-sensor reader structure in this embodiment.

The MR elements 602, 604 may comprise any layers and materials known in the art. In one example, the MR elements 602, 604 may comprise at least a free layer and a barrier layer. More specifically, the MR elements 602, 604 may comprise, for example, a 1 nm Ta underlayer, a 5 nm IrMn antiferromagnetic (AFM) layer, a 2 nm CoFeB pinned layer, a MgO tunnel insulating film, and a free layer comprising a 5 nm CoFeB/2 nm NiFe laminated film.

Any suitable formation techniques known in the art may be used to form the various layers and shapes described in FIGS. 10A-10F, including but not limited to, mask patterning, double patterning, ArF exposure, ArF liquid immersion, EUV, Ar ion milling, RIE, sputtering, LTS, lift-off, CMP, and others not specifically described herein that are known in the art.

The method described in FIGS. 10A-10F is representative of the formation of one embodiment of a multi-sensor reader structure. Although two MR elements 602, 604 are shown, it is possible to form more than two MR elements in each read head, as would be understood by one of skill in the art, such as three, four, 10, 16, 24, 32, etc.

The multi-element magnetic read head described herein according to various embodiments allows for signals of the included elements to be separately extracted along the element height direction, and facilitates a narrowing of the read gap width and an increase in the recording density possible for a magnetic medium used in conjunction with the multi-element magnetic read head.

Figure 11:
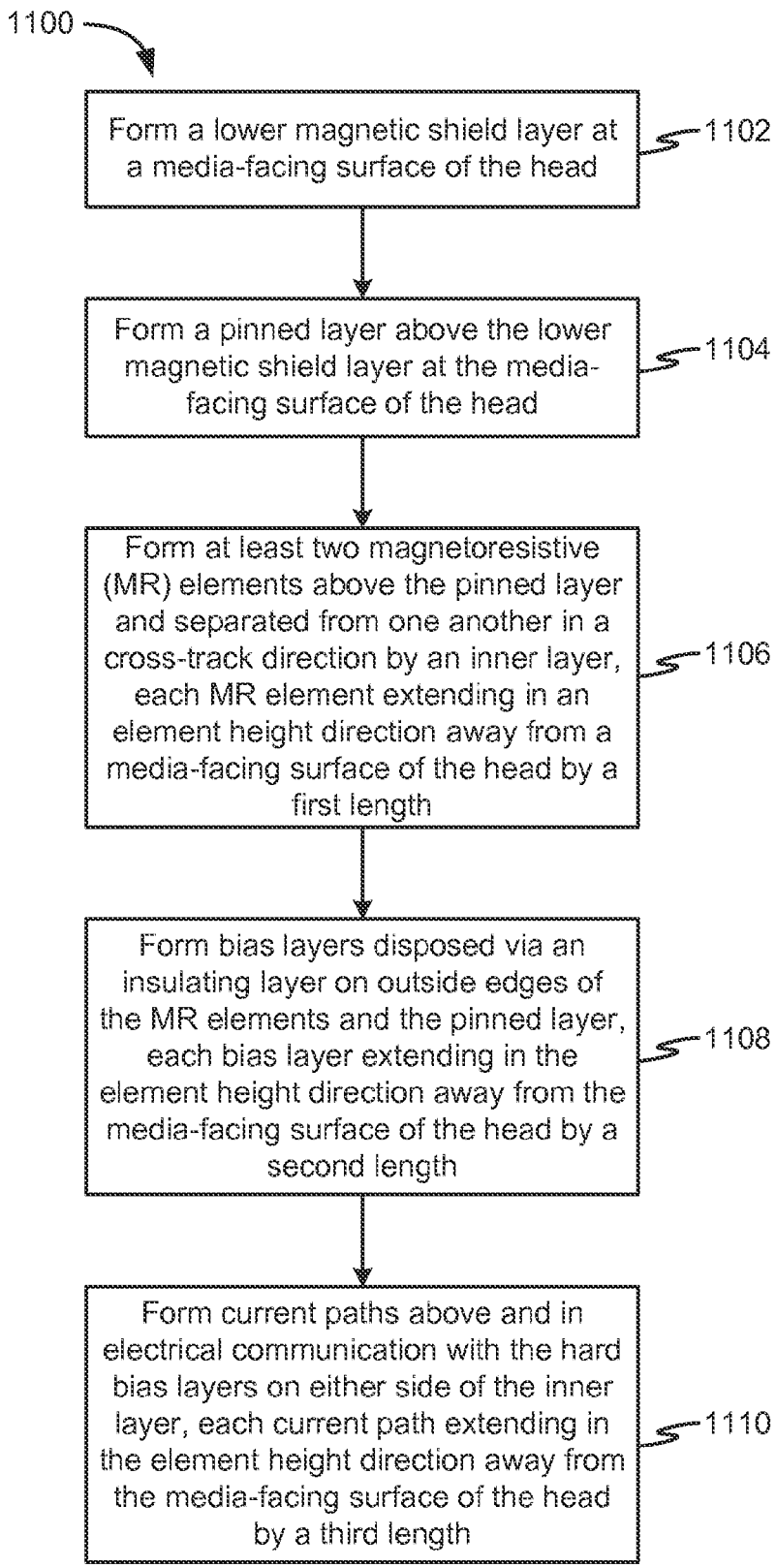
FIG. 11 shows a flowchart of a method according to one embodiment.

In FIG. 11, a method 1100 for forming a multi-sensor magnetic head is shown according to one embodiment. The method 1100 may be implemented in any desired environment, including but not limited to those depicted in FIGS. 1-10F, among others.

In operation 1102, a lower magnetic shield layer is formed at a media-facing surface of the head. Any suitable material and formation technique known in the art may be used to form the lower magnetic shield layer.

In operation 1104, a pinned layer is formed above the lower magnetic shield layer at the media-facing surface of the head. Any suitable material and formation technique known in the art may be used to form the pinned layer.

In operation 1106, at least two magnetoresistive (MR) elements are formed above the pinned layer and separated from one another in a cross-track direction by an inner layer, each MR element extending in an element height direction away from a media-facing surface of the head by a first length. The at least two MR elements are positioned at a media-facing surface of the head. Any suitable material(s) and formation technique(s) known in the art may be used to form the MR elements and the inner layer.

In a further embodiment, four, six, eight, or more MR elements may be formed in a single head.

In another embodiment, the at least two MR elements may be formed by: forming a barrier layer above the pinned layer and forming a free layer above the barrier layer, the free layer being configured to sense data on a magnetic medium passed across the media-facing surface of the head. Any suitable material(s) and formation technique(s) known in the art may be used to form the barrier and free layers. Furthermore, in some instances, the MR elements referred to herein may include portions of the pinned layer.

According to one embodiment, the inner layer may have at least one of: a rectangular cross-sectional shape and an inverted trapezoidal shape, when viewed from the media-facing surface of the head.

In operation 1108, bias layers are formed on outside edges of the MR elements and the pinned layer, separated therefrom by an insulating layer. Each bias layer extends in the element height direction away from the media-facing surface of the head by a second length. Any suitable material(s) and formation technique(s) known in the art may be used to form the bias layers.

In operation 1110, current paths are formed above and in electrical communication with the bias layers on either side of the inner layer, each current path extending in the element height direction away from the media-facing surface of the head by a third length. The third length is greater than the first length to reduce an electrical resistance of the current paths. Any suitable material(s) and formation technique(s) known in the art may be used to form the current paths.

In a further embodiment, the method 1100 may include forming an upper magnetic shield layer disposed via a second insulating layer above the current paths and the inner layer. Any suitable material(s) and formation technique(s)

known in the art may be used to form the upper magnetic shield layer and the insulating layer.

In another embodiment, method 1100 may include forming electric continuity layers above and in electrical communication with the MR elements, each electric continuity layer being disposed via an insulating layer on sides of the inner layer in the cross-track direction, the electric continuity layers being configured to electrically connect each current path with its respective MR element. Any suitable material(s) and formation technique(s) known in the art may be used to form the electric continuity layers and the insulating layer.

In an additional embodiment, the electric continuity layers and the current paths may be configured to act as electrical current paths and as magnetic shields. In yet another embodiment, method 1100 may include forming an upper magnetic shield layer above the current paths and the inner layer, and forming a second insulating layer between the upper magnetic shield layer and each of the current paths. In this embodiment, the inner layer may be configured to act as a magnetic shield, as it is in direct contact with the upper magnetic shield and comprises a material suitable for such use, such as NiFe and/or other suitable materials known in the art.

In various embodiments, the third length may be at least three times (such as 4 times, 5 times, 6 times, 10 times, etc.) the first length, the third length may be at least as great as the second length, the third length may be greater than the second length, the second length may be greater than the first length, etc.

It should be noted that methodology presented herein for at least some of the various embodiments may be implemented, in whole or in part, in computer hardware, software, by hand, using specialty equipment, etc., and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A multi-sensor reader structure, comprising:
   a lower magnetic shield layer positioned at a media-facing surface of the structure;
   a pinned layer positioned above the lower magnetic shield layer at the media-facing surface of the structure;
   at least two magnetoresistive (MR) elements positioned above the pinned layer and separated from one another in a cross-track direction by an inner layer, each MR element extending in an element height direction away from the media-facing surface of the structure by a first length;
   bias layers positioned on outside edges of the MR elements and the pinned layer, each bias layer extending in the element height direction away from the media-facing surface of the structure by a second length; and
   current paths positioned above and in electrical communication with the bias layers on either side of the inner layer, each current path extending in the element height direction away from the media-facing surface of the structure by a third length,
   wherein the third length is greater than the first length.

2. The structure as recited in claim 1, wherein each MR element comprises a barrier layer positioned above the pinned layer, and a free layer positioned above the barrier layer.

3. The structure as recited in claim 1, wherein the inner layer has a rectangular cross-sectional shape when viewed from the media-facing surface of the structure.

4. The structure as recited in claim 1, wherein the inner layer has an inverse trapezoidal cross-sectional shape when viewed from the media-facing surface of the structure.

5. The structure as recited in claim 1, further comprising at least three MR elements.

6. The structure as recited in claim 1, further comprising an upper magnetic shield layer positioned above the current paths and the inner layer.

7. The structure as recited in claim 1, further comprising electric continuity layers positioned above and in electrical communication with the MR elements, each electric continuity layer being positioned on sides of the inner layer in the cross-track direction, the electric continuity layers being configured to electrically connect each current path with its respective MR element.

8. The structure as recited in claim 7, wherein the electric continuity layers and the current paths are configured to act as electrical current paths and as magnetic shields.

9. The structure as recited in claim 7, further comprising an upper magnetic shield layer positioned above the current paths and the inner layer, wherein the inner layer is configured to act as a magnetic shield.

10. The structure as recited in claim 1, wherein the third length is at least three times the first length.

11. The structure as recited in claim 1, wherein the third length is at least as great as the second length.

12. The structure as recited in claim 1, wherein the third length is greater than the second length, and wherein the second length is greater than the first length.

13. A magnetic data storage system, comprising:
   at least one structure as recited in claim 1;
   a magnetic medium;
   a drive mechanism for passing the magnetic medium over the at least one structure; and
   a controller electrically coupled to the at least one structure for controlling operation of the at least one structure.

14. A magnetic head, comprising:
   a lower magnetic shield layer positioned at a media-facing surface of the head;
   a pinned layer positioned above the lower magnetic shield layer at the media-facing surface of the head;
   at least two magnetoresistive (MR) elements positioned above the pinned layer and separated from one another in a cross-track direction by an inner layer, each MR element extending in an element height direction away from the media-facing surface of the head by a first length;

bias layers positioned on outside edges of the MR elements and the pinned layer, each bias layer extending in the element height direction away from the media-facing surface of the head by a second length; and current paths positioned above and in electrical communication with the bias layers on either side of the inner layer, each current path extending in the element height direction away from the media-facing surface of the head by a third length, wherein the third length is at least three times the first length.

15. A method for forming a multi-sensor magnetic head, the method comprising:

forming a lower magnetic shield layer at a media-facing surface of the head;

forming a pinned layer above the lower magnetic shield layer at the media-facing surface of the head;

forming at least two magnetoresistive (MR) elements above the pinned layer and separated from one another in a cross-track direction by an inner layer, each MR element extending in an element height direction away from a media-facing surface of the head by a first length;

forming bias layers on outside edges of the MR elements and the pinned layer, each bias layer extending in the element height direction away from the media-facing surface of the head by a second length; and forming current paths above and in electrical communication with the bias layers on either side of the inner layer, each current path extending in the element height direction away from the media-facing surface of the head by a third length, wherein the at least two MR elements are positioned at a media-facing surface of the head, and wherein the third length is greater than the first length to reduce an electrical resistance of the current paths.

16. The method as recited in claim 15, wherein forming the at least two MR elements further comprises:

forming a barrier layer above the pinned layer; and forming a free layer above the barrier layer, the free layer being configured to sense data on a magnetic medium passed across the media-facing surface of the head.

17. The method as recited in claim 15, wherein the inner layer has at least one of: a rectangular cross-sectional shape and an inverted trapezoidal shape, when viewed from the media-facing surface of the head.

18. The method as recited in claim 15, further comprising forming an upper magnetic shield layer above the current paths and the inner layer.

19. The method as recited in claim 15, further comprising forming electric continuity layers above and in electrical communication with the MR elements, each electric continuity layer being formed on sides of the inner layer in the cross-track direction, the electric continuity layers being configured to electrically connect each current path with its respective MR element.

20. The method as recited in claim 19, wherein the electric continuity layers and the current paths are configured to act as electrical current paths and as magnetic shields.

21. The method as recited in claim 19, further comprising:

forming an upper magnetic shield layer above the current paths and the inner layer, wherein the inner layer is configured to act as a magnetic shield.

22. The method as recited in claim 15, wherein the third length is at least three times the first length, and wherein the third length is at least as great as the second length.

23. The method as recited in claim 15, wherein the third length is greater than the second length, and wherein the second length is greater than the first length.

* * * * *